(12) United States Patent
Piao et al.

(10) Patent No.: US 12,468,200 B1
(45) Date of Patent: Nov. 11, 2025

(54) DISPLAY PANEL AND DISPLAY APPARATUS

(71) Applicant: Xiamen Tianma Optoelectronics Co., Ltd., Xiamen (CN)

(72) Inventors: Zhe Piao, Xiamen (CN); Yiwei Wu, Xiamen (CN); Yalan Guo, Xiamen (CN); Wanyu Su, Xiamen (CN); Jiaqi Kang, Xiamen (CN); Chenpeng Wang, Xiamen (CN); Kaiming Sun, Xiamen (CN); Xuyang Weng, Xiamen (CN); Jinmei Chen, Xiamen (CN)

(73) Assignee: XIAMEN TIANMA OPTOELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 18/788,124

(22) Filed: Jul. 30, 2024

(30) Foreign Application Priority Data

May 8, 2024 (CN) .......................... 202410565077.7

(51) Int. Cl.
  *G02F 1/1362* (2006.01)
  *H10D 86/40* (2025.01)
  *H10D 86/60* (2025.01)

(52) U.S. Cl.
  CPC .. *G02F 1/136286* (2013.01); *G02F 1/136209* (2013.01); *H10D 86/441* (2025.01); *H10D 86/60* (2025.01)

(58) Field of Classification Search
  CPC ........ G02F 1/136209; G02F 1/136286; H10D 86/441
  USPC .......................................................... 349/33
  See application file for complete search history.

(56) References Cited

U.S. PATENT DOCUMENTS

| | | | |
|---|---|---|---|
| 2017/0205934 A1* | 7/2017 | Lee ...................... | H10D 86/441 |
| 2018/0143711 A1* | 5/2018 | Ono .................... | G02F 1/13338 |
| 2018/0188615 A1* | 7/2018 | Li ..................... | G02F 1/134309 |
| 2020/0348571 A1* | 11/2020 | Ryu .................... | G09G 3/3648 |
| 2021/0011570 A1* | 1/2021 | Luo .................... | G02F 1/13338 |
| 2022/0137740 A1* | 5/2022 | Morinaga ......... | G02F 1/134309 345/174 |
| 2022/0137783 A1* | 5/2022 | Paik .................... | G06F 3/04164 345/174 |

(Continued)

FOREIGN PATENT DOCUMENTS

| | | |
|---|---|---|
| CN | 109388265 A | 2/2019 |
| CN | 116819817 A | 9/2023 |

*Primary Examiner* — Christopher M Raabe
(74) *Attorney, Agent, or Firm* — East IP P.C.

(57) ABSTRACT

Embodiments of the present application provides a display panel and a display apparatus, the display panel comprising a plurality of first signal lines and a plurality of second signal lines, the second signal line and part of the first signal lines being insulated and crossed to define a plurality of pixel opening areas; part of the first signal lines overlapping with the pixel opening area along a thickness direction of the display panel to decrease a distance between two adjacent ones of the first signal lines and reduce the coupling interference, while reducing a shortcut between two adjacent ones of the first signal lines; the display panel further comprising a first pixel electrode overlapping with the first signal line in the thickness direction of the display panel; a width D1 of the first pixel electrode and a width D2 of any other pixel electrode satisfying $|D1-D2|/D1 \leq 20\%$ along the second direction.

20 Claims, 15 Drawing Sheets

(56) References Cited

U.S. PATENT DOCUMENTS

| | | | |
|---|---|---|---|
| 2025/0060634 A1* | 2/2025 | Um | G02F 1/134309 |
| 2025/0093720 A1* | 3/2025 | Wang | G02F 1/1343 |
| 2025/0231436 A1* | 7/2025 | Tang | G06F 3/0443 |

* cited by examiner

DISPLAY PANEL AND DISPLAY APPARATUS

CROSS-REFERENCE TO RELATED APPLICATION

The present application claims priority to Chinese Patent Application No. 202410565077.7 filed on May 8, 2024, and titled "DISPLAY PANEL AND DISPLAY APPARATUS", which is incorporated herein by reference in its entirety.

TECHNICAL FIELD

The present application relates to the technical field of display technology, and in particular to a display panel and a display apparatus.

BACKGROUND

With the rapid development of display technology, touch screens have gradually become popular in people's lives. Due to the advantages of embedded touch technology such as compatibility with display substrate technology, simple manufacturing process and low cost, it has quickly occupied the dominant position in touch technology. Therefore, the development of embedded touch technology has potential commercial value.

For embedded touch panels, there are many wiring structures inside the panel, which easily causes signal coupling of adjacent wirings, affecting the display effect and touch accuracy. In addition, many wirings will compress the distance between two adjacent wirings, which requires higher process accuracy.

SUMMARY

Embodiments of the present application provide a display panel and a display apparatus to reduce coupling of adjacent wirings and reduce process difficulty.

In a first aspect, an embodiment of the present application provides a display panel, comprising a plurality of first signal lines extending along a first direction and being arranged along a second direction, and a plurality of second signal lines being arranged along the first direction and extending along the second direction; and the first direction intersecting with the second direction;

the second signal line and part of the first signal lines being insulated and crossed to define a plurality of pixel opening areas, and part of the first signal lines overlapping with the pixel opening area along a thickness direction of the display panel;

the display panel further comprising a pixel electrode located in the pixel opening area, the pixel electrode comprising a first pixel electrode overlapping with the first signal line in the thickness direction of the display panel; a width D1 of the first pixel electrode and a width D2 of any other pixel electrode satisfying $|D1-D2|/D1 \leq 20\%$ along the second direction.

In a second aspect, embodiments of the present application provides a display apparatus, comprising the display panel of the first aspect.

In a technical solution provided by an embodiment of the present application, the display panel comprises a plurality of first signal lines and a plurality of second signal lines, and the second signal lines and part of the first signal lines are insulated and crossed to define a plurality of pixel opening areas; along the thickness direction of the display panel, part of the first signal lines overlap with the pixel opening area, and part of the first signal lines overlap with the gaps between the pixel opening areas. Compared with the solution in which all the first signal lines overlap with the gaps between the pixel opening areas, the distance between two adjacent first signal lines can be increased, so that the coupling interference between the two adjacent first signal lines can be reduced, the signal accuracy of the display signal and the touch signal can be improved, and a good display effect and touch accuracy can be ensured. In addition, by increasing the distance between two adjacent first signal lines, a short circuit between the two adjacent first signal lines can be avoided, the process difficulty can be reduced, and the manufacturing efficiency can be improved. Moreover, part of the first signal lines overlap with the pixel opening area, and part of the first signal lines overlap with the gaps between the pixel opening area, which can further reduce the areas occupied by the gaps between the pixel electrodes to leave more space for arranging the pixel electrodes, which is conducive to improving the display resolution of the display panel. Furthermore, the display panel further comprises a pixel electrode located in the pixel opening area, the pixel electrode comprising a first pixel electrode overlapping with the first signal line along the thickness direction of the display panel; along the second direction, the width D1 of the first pixel electrode and the width D2 of any other pixel electrode satisfy $|D1-D2|/D1 \leq 20\%$, that is, the width of the first pixel electrode is the same or similar to that of any other pixel electrode, and the width of the first pixel electrode will not increase due to overlapping with the first signal line, thereby ensuring that the optical and electrical properties of different pixel electrodes have good uniformity and the display effect is guaranteed.

DETAILED DESCRIPTION

The present application will be further described in detail below in conjunction with the accompanying drawings and embodiments. It is to be understood that the specific embodiments described herein are only used to explain the present application, rather than to limit the present application. It should also be noted that, for ease of description, only parts related to the present application, rather than all structures, are shown in the accompanying drawings.

Figure 1:
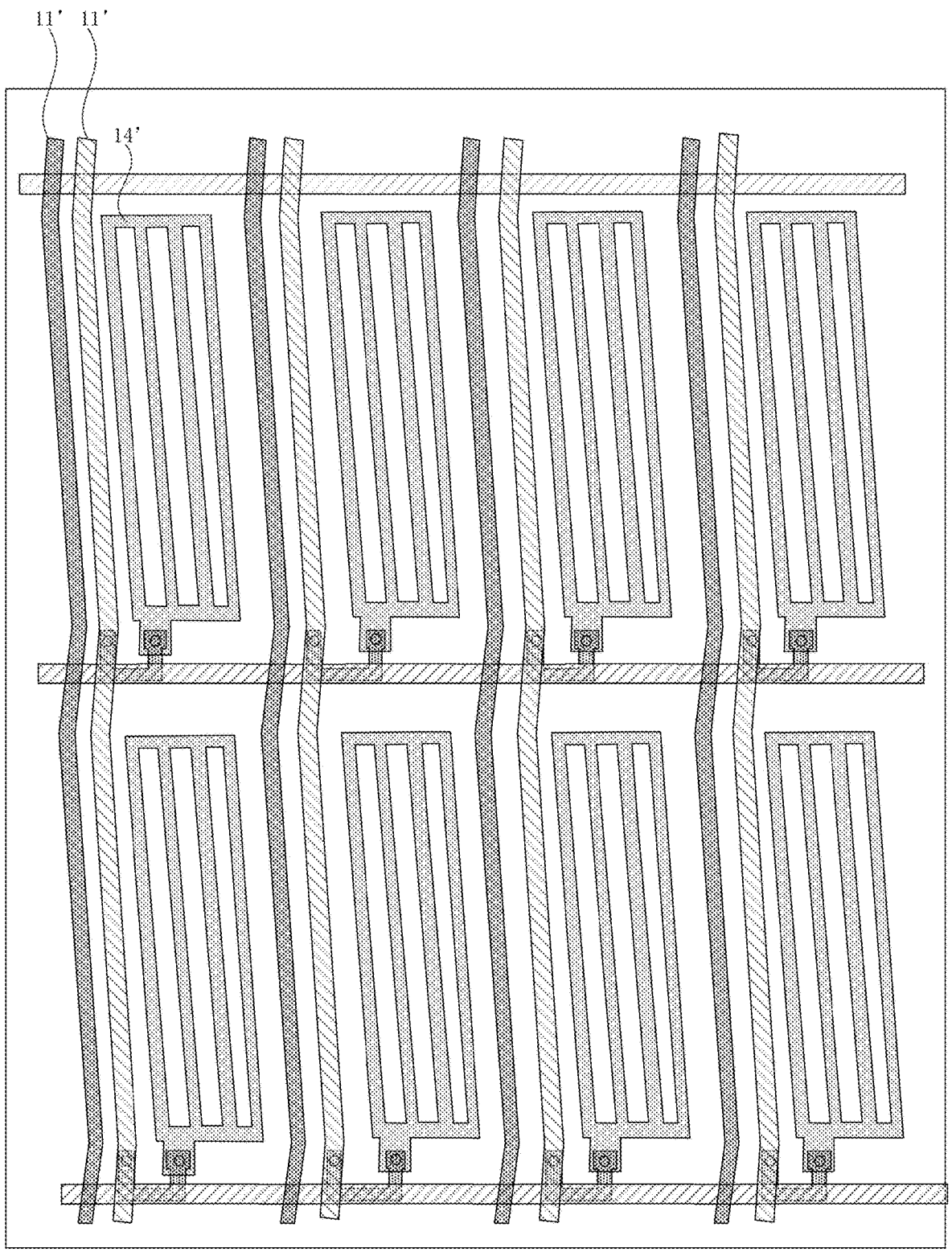
FIG. 1 is a schematic structural diagram of a top view of a display panel in the related art.

FIG. 1 is a schematic structural diagram of a top view of a display panel in the related art. As shown in FIG. 1, the display panel comprises pixel electrodes 14' and signal lines 11' located between two adjacent pixel electrodes 14'. The signal lines 11' can be, for example, a data signal line and a touch signal line to realize the display function and touch function of the display panel. In the prior art, the data signal line and the touch signal line are both located between two adjacent columns of pixel electrodes. In this way, the gap between the two adjacent columns of pixel electrodes will occupy a larger area, squeezing the space for arranging the pixel electrodes, which is not conducive to improving the display resolution of the display panel. In addition, different signal lines are provide in the same pixel electrode gap, and there will be coupling interference between the two adjacent signal lines, which affects the accuracy of signal transmission in the signal line; moreover, different signal lines are provide in the same pixel electrode gap, and the gap between the two adjacent signal lines is very small. In order to avoid the risk of short circuit, the processing difficulty of the signal line will be greatly increased.

Based on the above technical problems, an embodiment of the present application provides a display panel, comprising a plurality of first signal lines extended along a first direction and arranged along a second direction, and a plurality of second signal lines arranged along the first direction and extended along the second direction; the first direction and the second direction intersect; the second signal lines and part of the first signal lines are insulated and crossed to define a plurality of pixel opening areas; along the thickness direction of the display panel, part of the first signal lines overlap with the pixel opening areas; the display panel further comprises a pixel electrode located in the pixel opening area, the pixel electrode comprises a first pixel electrode overlapping with the first signal line in the thickness direction of the display panel; along the second direction, the width D1 of the first pixel electrode and the width D2 of any other pixel electrode satisfy $|D1-D2|/D1 \leq 20\%$. By adopting the above technical solution, part of the first signal lines overlap with the gap between the pixel opening areas, compared with the solution in which all the first signal lines overlap with the gaps between the pixel opening areas, the distance between two adjacent first signal lines can be increased, so that the coupling interference between the two adjacent first signal lines can be reduced, the signal accuracy of the display signal and the touch signal can be improved, and a good display effect and touch accuracy can be ensured. In addition, by increasing the distance between two adjacent first signal lines, short circuits between two adjacent first signal lines can be avoided, which can reduce the difficulty of the process and ensure the improvement of the manufacturing efficiency. Moreover, part of the first signal lines overlap with the pixel opening area, and part of the first signal lines overlap with the gap between the pixel opening area, which can further reduce the area occupied by the gap between the pixel electrodes, so as to leave more space for providing the pixel electrode, which is beneficial to improve the display resolution of the display panel. Furthermore, the first pixel electrode overlaps with the first signal line in the thickness direction of the display panel; along the second direction, the width D1 of the first pixel electrode and the width D2 of any other pixel electrode satisfy $|D1-D2|/D1 \leq 20\%$, that is, the width of the first pixel electrode is the same or similar to that of any other pixel electrode, and the width of the first pixel electrode will not increase due to overlapping with the first signal line, so as to ensure the uniformity of the optical and electrical properties of different pixel electrodes and the display effect.

The above is the core idea of the present application. The technical solution in the embodiments of the present application will be clearly and completely described below in conjunction with the drawings in the embodiments of the present application. Based on the embodiments of the present application, all other embodiments obtained by those skilled in the art without making creative work are within the scope of protection of the present application.

Figure 2:
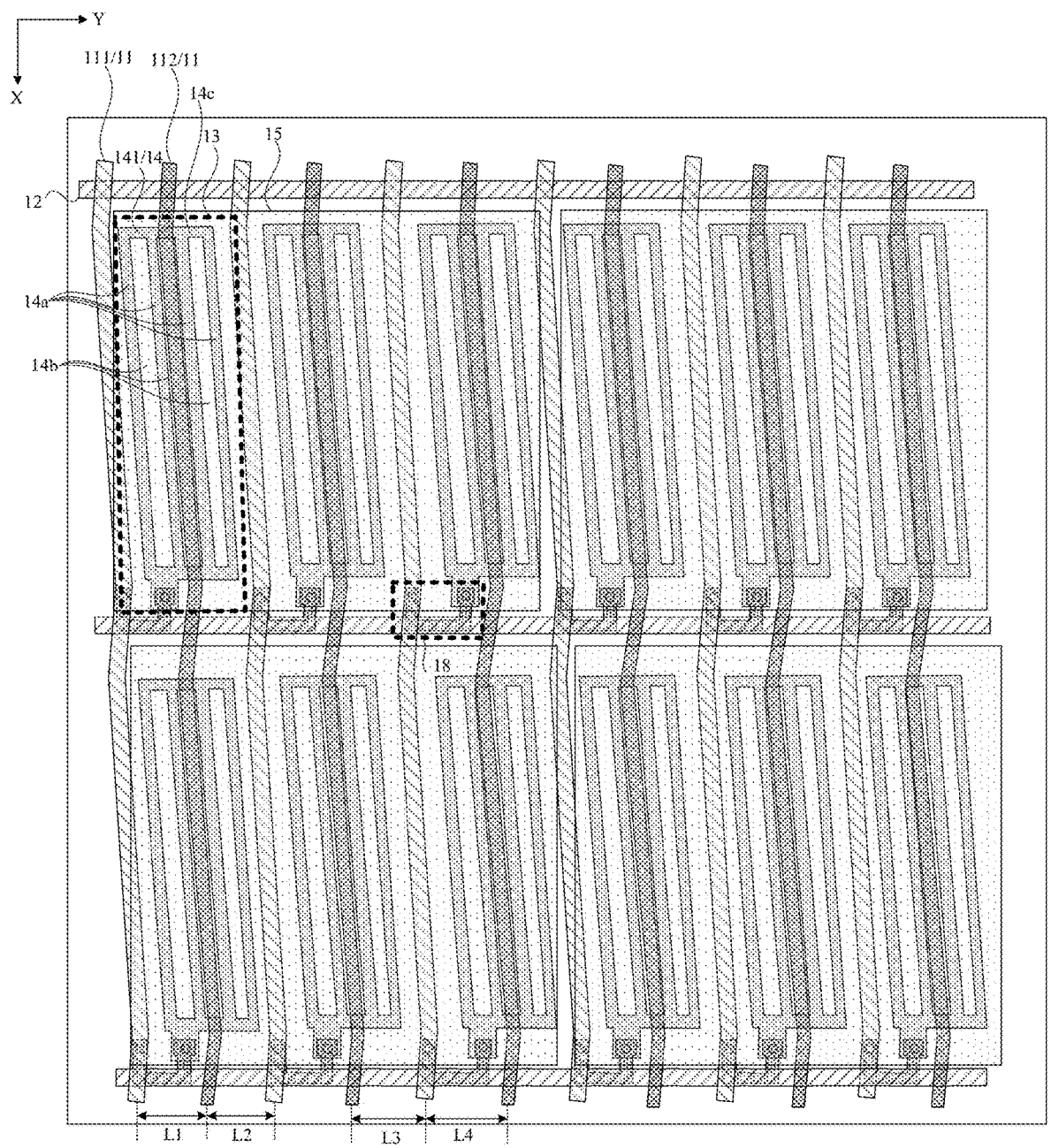
FIG. 2 is a schematic structural diagram of a top view of a display panel provided by an embodiment of the present application.
Figure 3:
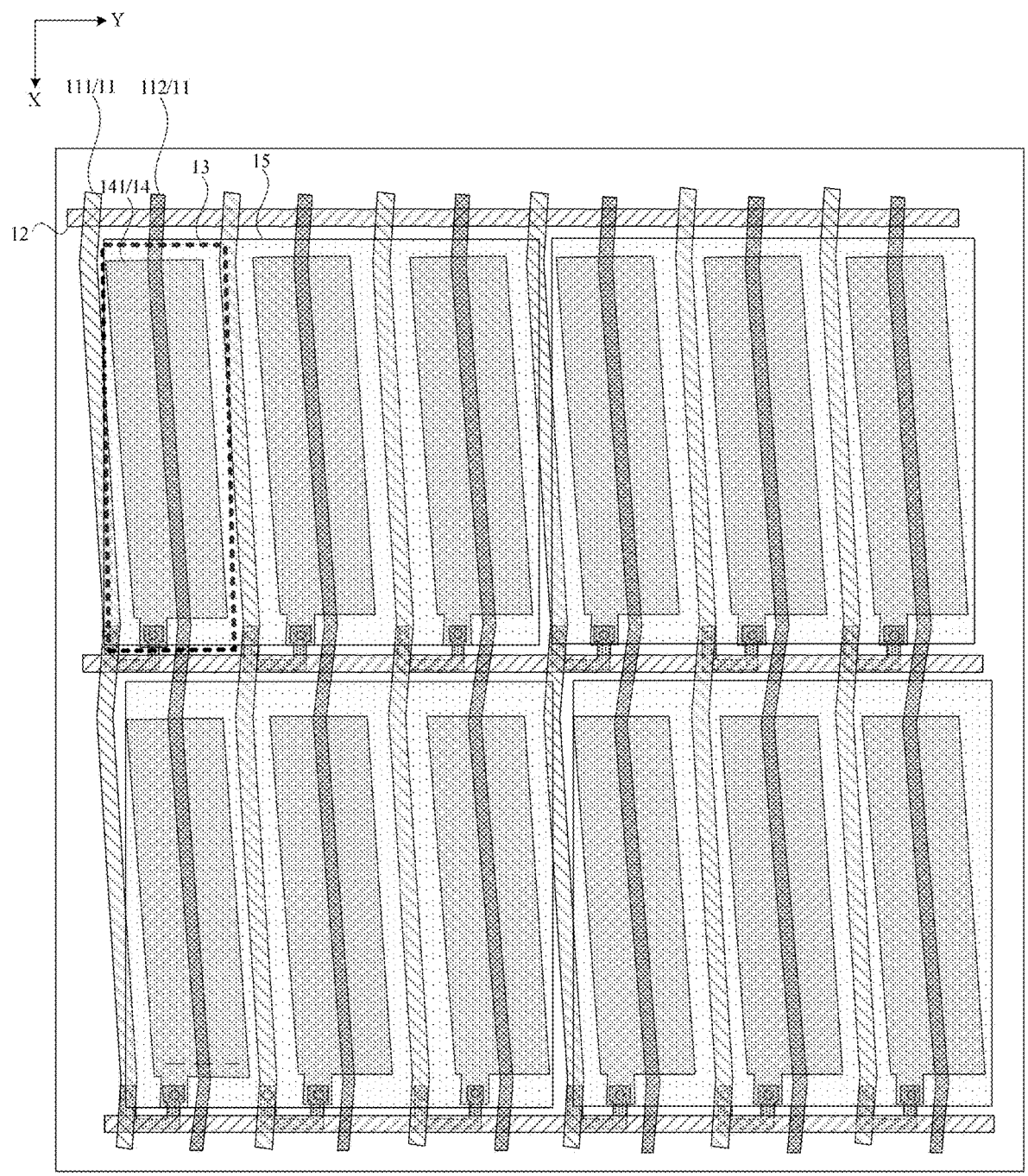
FIG. 3 is a schematic structural diagram of a top view of another display panel provided by an embodiment of the present application.
Figure 4:
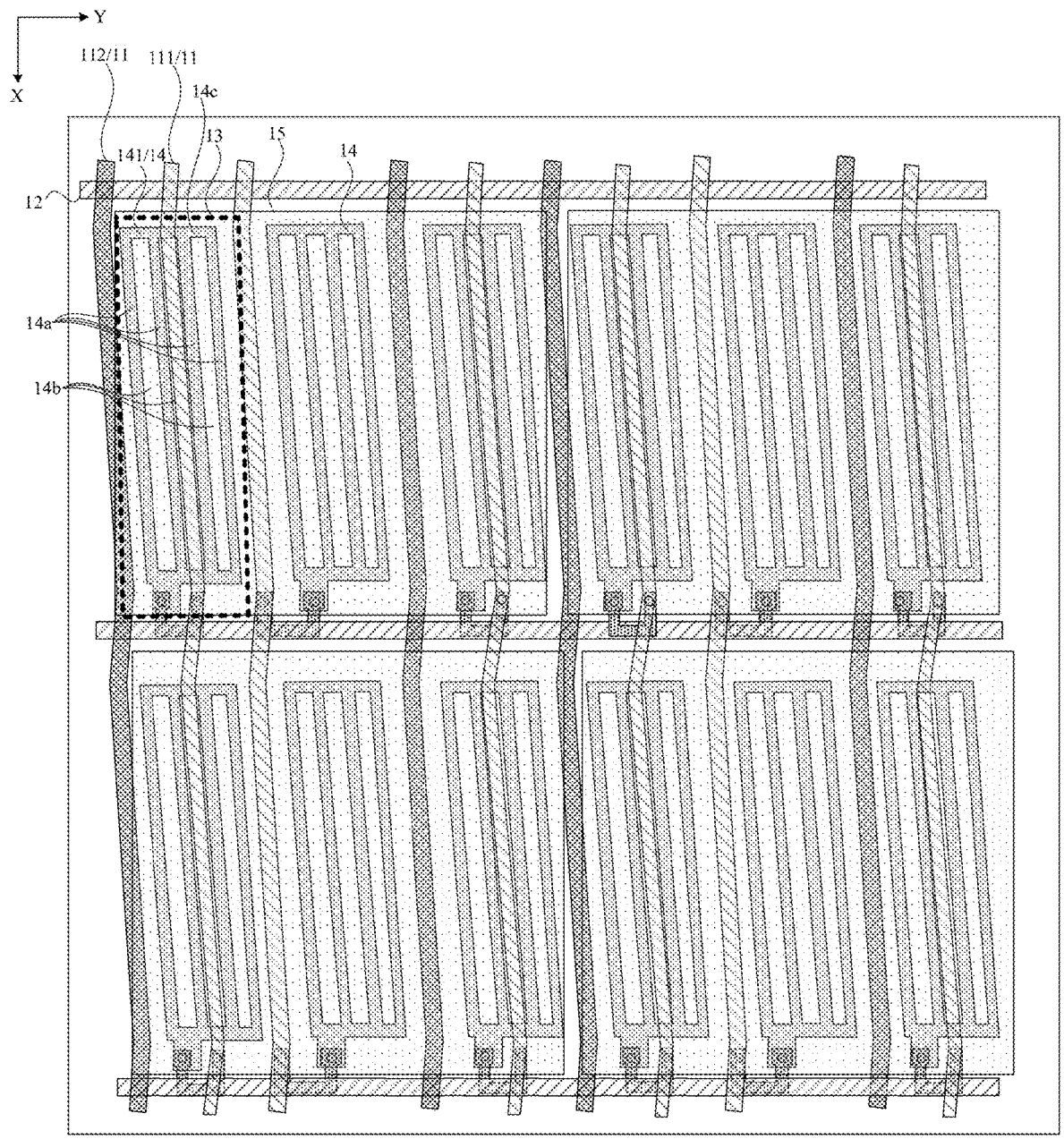
FIG. 4 is a schematic structural diagram of a top view of another display panel provided by an embodiment of the present application.

FIG. 2 is a schematic structural diagram of a top view of a display panel provided in an embodiment of the present application, FIG. 3 is a schematic structural diagram of a top view of another display panel provided in an embodiment of the present application, and FIG. 4 is a schematic structural diagram of a top view of another display panel provided in an embodiment of the present application. As shown in FIGS. 2 to 4, the display panel provided in an embodiment of the present application comprises a plurality of first signal lines 11 and a plurality of second signal lines 12, wherein the plurality of first signal lines 11 extend along a first direction (the direction X shown in the figure, and the first direction X is used as an example for explanation in the following) and are arranged along a second direction (the direction Y shown in the figure, and the second direction Y is used as an example for explanation in the following), and the plurality of second signal lines 12 are arranged along the first direction X and extend along the second direction Y; the first direction X and the second direction Y intersect; the second signal line 12 and part of the first signal lines 11 are insulated and crossed to define a plurality of pixel opening areas 13; along the thickness direction of the display panel, part of the first signal lines 11 overlap with the pixel opening areas 13;

the display panel further comprises pixel electrodes 14 located in the pixel opening area 13 and including a first pixel electrode 141 overlapping with the first signal line 11 in the thickness direction of the display panel; along the second direction, a width D1 of the first pixel electrode 141 and a width D2 of any of the other pixel electrodes 14 satisfy |D1−D2|/D1≤20%.

Specifically, the display panel provided by embodiments of the present application may be a liquid crystal display panel, which comprises a pixel electrode 14, a common electrode 15, and a liquid crystal layer (not shown in the figure) that comprises a plurality of liquid crystal molecules configured to deflect under the action of a voltage signal in the pixel electrode 14 and a voltage signal in the common electrode 15 and transmit light provided by a backlight module (not shown in the figure), thereby achieving the display effect of the liquid crystal display panel. Further, the liquid crystal display panel provided by embodiments of the present application may be a twisted nematic liquid crystal display panel, in which case the pixel electrode 14 and the common electrode 15 may be provided on opposite sides of the liquid crystal layer, and the liquid crystal molecules are configured to deflect vertically under the action of a voltage signal in the pixel electrode 14 and a voltage signal in the common electrode 15. Alternatively, the liquid crystal display panel provided in embodiments of the present application may be a planar control mode display panel, in which case the pixel electrode 14 and the common electrode 15 may be provided on the same side of the liquid crystal layer, and the liquid crystal molecules are configured to deflect in plane under the action of a voltage signal in the pixel electrode 14 and a voltage signal in the common electrode 15. Furthermore, the planar control mode display panel may comprise a Fringe Field Switching (FFS) display panel or an In-Plane Switching (IPS) display panel. Embodiments of the present application do not limit the specific type of the liquid crystal display panel. The subsequent embodiments are described by taking the liquid crystal display panel as a planar control mode display panel as an example.

Furthermore, the display panel provided in embodiments of the present application can be a touch display panel, that is, the display panel integrates the touch function and the display function to implement the control and adjustment of the display panel according to the user's touch operation. Specifically, as shown in FIGS. 2, 3 and 4, the display panel provided in embodiments of the present application comprises a plurality of first signal lines 11 and a plurality of second signal lines 12, the plurality of first signal lines 11 extending along the first direction X and being arranged along the second direction Y, the plurality of second signal lines 12 being arranged along the first direction X and extending along the second direction Y; the second signal lines 12 and part of the first signal lines 11 are insulated and crossed to define a plurality of pixel opening areas 13, that is, to define a plurality of sub-pixels, and each of the pixel opening areas 13 corresponds to a sub-pixel. Herein, the first signal lines 11 may include a data signal line 111 and a touch signal line 112. The data signal line 111 may provide a data signal to the pixel electrode 14 to ensure that an electric field for controlling the deflection of the liquid crystal is formed between the pixel electrode 14 and the common electrode 15; the touch signal line 112 may provide a touch driving signal to the touch electrode and transmit a touch sensing signal fed back by the touch electrode to a touch chip (not shown in the figure), so that the touch chip determines the touch position and/or the touch pressure according to the touch driving signal and the touch sensing signal to implement the touch function of the display panel. The second signal line 12 may be a scan signal line, which is used to provide an enable signal to the pixel circuit to control the pixel circuit to be turned on so as to write the data signal to the pixel electrode. It should be noted that the pixel electrode 14 in the embodiment of the present application can be understood as the entire electrode structure arranged in the pixel opening area 13. The pixel electrode 14 can comprise a plurality of branch electrodes 14a as shown in FIGS. 2 and 4, or can comprise a whole electrode as shown in FIG. 3; the branch electrodes 14a can be understood as a plurality of interconnected electrode portions extending in the first direction X and arranged in the second direction Y, with a gap 14b formed between two adjacent branch electrodes 14a, as shown in FIGS. 2 and 4, and different branch electrodes 14a in the same pixel electrode 14 are connected via a connection portion 14c to form a pixel electrode 14 with the same potential.

It can be understood that, since the pixel electrodes 14 are provided in the pixel opening areas 13, the position of the pixel electrodes 14 in the embodiment of the present application will not change, and different types of first signal lines can be determined according to the relative position relationship with the pixel electrode 14. Specifically, part of the first signal lines 11 insulated and crossed with the second signal line 12 to define a plurality of pixel opening areas 13 can be understood as such first signal lines that do not overlap with the pixel electrodes 14, that is, the first signal lines located to the side of the pixel electrode 14 in the second direction Y Part of the first signal lines overlapping with the pixel opening areas 13 in the thickness direction of the display panel can be understood as such first signal lines that overlap with the pixel electrodes 14, where overlapping with the pixel electrodes 14 here can be understood as overlapping with the whole pixel electrodes 14 as shown in FIG. 3, or overlapping with the connection portions 14c in the pixel electrodes 14 as shown in FIG. 2 and FIG. 4. For example, in FIGS. 2 and 3, the part of the first signal lines 11 insulated and crossed with the second signal line 12 to define the plurality of pixel opening areas 13 are data signal lines 111; the part of the first signal lines 11 overlapping with the pixel opening area 13 in the thickness direction of the display panel are touch signal lines 112, or as shown in FIGS. 2 and 4, overlapping with the connection portion 14c in the pixel electrode 14. In FIG. 4, the part of the first signal lines 11 insulated and crossed with the second signal lines 12 to define the plurality of pixel opening areas 13 include data signal lines 111 and touch signal lines 112, and the part of the first signal lines 11 overlapping with the pixel opening areas 13 in the thickness direction of the display panel are data signal lines 111.

Still referring to FIGS. 2, 3 and 4, part of the first signal lines 11 overlap with the pixel opening areas 13, and part of the first signal lines 11 overlap with the gaps between two adjacent pixel opening areas 13. That is to say, different from the solution in the prior art in which the first signal lines overlap with the gaps between two adjacent pixel opening areas 13, the technical solution in embodiments of the present application adjusts the positions of part of the first signal lines 11. With the arrangement that part of the first signal lines 11 overlap with the pixel opening areas 13, and that part of the first signal lines 11 overlap with the gaps between two adjacent pixel opening areas 13, the distance between two adjacent first signal lines 11 can be increased, so that the coupling interference between the two adjacent first signal lines 11 can be reduced, the signal accuracy of the display signal and the touch signal can be improved, and the good display effect and touch accuracy can be ensured; in addition, increasing the distance between the two adjacent first signal lines 11 can avoid a short circuit between the two adjacent first signal lines 11, which can reduce the process difficulty and improve the manufacturing efficiency. Moreover, part of the first signal lines 11 overlap with the pixel opening areas 13, and part of the first signal lines 11 overlap with the gaps between the pixel opening areas 13, so that the area occupied by the gaps between the pixel electrodes 14 can be reduced to leave more space for providing the pixel electrode 14, which is beneficial to improving the display resolution of the display panel.

Further, the pixel electrodes 14 include a first pixel electrode 141, which can be understood as a pixel electrode overlapping with the first signal line 11 in the thickness direction of the display panel. Further, the width of the first pixel electrode 141 in the second direction Y can be understood as the sum of the widths of the electrode portions in the first pixel electrode 141 in the second direction Y As shown in FIGS. 2 and 4, when the first pixel electrode 141 comprises a plurality of branch electrodes, the width of the first pixel electrode 141 in the second direction Y can be understood as the sum of the widths of the plurality of branch electrodes in the second direction Y; when the first pixel electrode 141 comprises a whole electrode, the width of the first pixel electrode 141 in the second direction Y can be understood as the overall width of the whole electrode in the second direction Y The width D1 of the first pixel electrode 141 in the second direction Y and the width D2 of any of the other pixel electrodes 14 in the second direction Y satisfy $|D1-D2|/D1 \leq 20\%$, that is, the width of the first pixel electrode 141 is set to be the same or similar to that of any other pixel electrode 14, and the width of the first pixel electrode 141 does not change relative to that of other pixel electrodes 14 due to overlapping with the first signal line 11, which can ensure that the display effects of sub-pixels where different pixel electrodes are located are the same or similar, and can ensure the overall display balance of the display panel. In addition, by setting the width of the first pixel electrode 141 to be the same or similar to that of any other pixel electrode 14, it can also be ensured that the light transmission effects of different pixel electrodes are the same or similar, guaranteeing the balanced overall optical characteristics of the display panel.

It should be noted that the display panel provided in the embodiment of the present application may further comprise other structures. In order to illustrate the relative position relationship of the first signal line and the pixel electrode, only part but not all of the structures are shown here. Other structures in the display panel will be described in subsequent embodiments.

In conclusion, the display panel provided by embodiments of the present application can increase the distance between two adjacent first signal lines, reduce the coupling interference between two adjacent first signal lines, improve the signal accuracy of display signals and touch signals, and ensure good display effects and touch accuracy by part of the first signal lines overlapping with the gap between the pixel opening areas, compared with the solution in which all the first signal lines overlap the gap between the pixel opening areas. In addition, by increasing the distance between two adjacent first signal lines, short circuit between two adjacent first signal lines may also be avoided, which can reduce the process difficulty and ensure the improvement of manufacturing efficiency. Moreover, part of the first signal lines overlap with the pixel opening area, and part of the first signal lines overlap with the gap between the pixel opening areas, which can also reduce the area occupied by the gap between the pixel electrodes, so as to leave more space for providing the pixel electrodes, which is conducive to improving the display resolution of the display panel. Furthermore, the first pixel electrode overlaps with the first signal line in the thickness direction of the display panel; along the second direction, the width D1 of the first pixel electrode and the width D2 of any other pixel electrode satisfy $|D1-D2|/D1 \leq 20\%$, that is, the width of the first pixel electrode is the same or similar to that of any other pixel electrode, and the width of the first pixel electrode will not increase due to overlapping with the first signal line, thereby ensuring good uniformity of optical and electrical properties of different pixel electrodes and ensuring display effect.

As described above, the first signal lines 11 may include data signal lines 111 and touch signal lines 112 which may be arranged in the same layer, thereby simplifying the film structure of the display panel and facilitating the realization of a thin display panel. In addition, the data signal lines 111 and the touch signal lines 112 arranged in the same layer may be manufactured in the same mask process, which can simplify the manufacturing process of the display panel and improve the manufacturing efficiency.

Moreover, as the data signal lines 111 and the touch signal lines 112 are arranged in the same layer, the solution of arranging part of the first signal lines 11 to overlap with the pixel opening areas 13 in an embodiment of the present application can fully reduce the coupling interference between two adjacent first signal lines 11, and improve the signal accuracy of the display signal and the touch signal. Also it can avoid short circuit between two adjacent first signal lines 11, reduce the process difficulty, and ensure the improvement of manufacturing efficiency.

It should be noted that the different filling patterns used for the data signal lines 111 and the touch signal lines 112 in FIGS. 2, 3 and 4 are only for distinguishing different routing types, rather than limiting different film layer settings.

As a feasible implementation manner, referring to FIG. 2, the pixel electrode 14 comprises a plurality of connected branch electrodes 14a extending along the first direction X and arranged along the second direction Y Along the second direction Y, a sum D1 of widths of the plurality of branch electrodes 14a in a first pixel electrode 141 and a sum D2 of widths of the plurality of branch electrodes 14a in any other pixel electrode 14 satisfy $|D1-D2|/D1 \leq 20\%$.

Specifically, the pixel electrode 14 comprises a plurality of branch electrodes 14a extending along the first direction X and being arranged along the second direction Y, and a hollow portion 14b exists between two branch electrodes 14a adjacently arranged along the second direction Y The plurality of branch electrodes 14a are connected together at an end of the pixel electrode 14 along the first direction X to form a pixel electrode of the same potential. By providing the pixel electrode 14 comprising the plurality of branch electrodes 14a, it is ensured that a deflection electric field of liquid crystal molecules is formed between the pixel electrode 14 and the common electrode 15, while ensuring the light transmittance of the pixel electrode 14, thereby improving the display brightness of the liquid crystal display panel.

Further, for the solution that the pixel electrode 14 comprises a plurality of branch electrodes 14a, the width of the pixel electrode 14 in the second direction Y can be understood as the sum of the widths of the plurality of branch electrodes 14a in the same pixel electrode 14 in the second direction Y Therefore, the width of the first pixel electrode 141 is the sum of the widths of the plurality of branch electrodes 14a in the first pixel electrode 141 in the second direction Y By setting the sum D1 of the widths of the plurality of branch electrodes 14a in the first pixel electrode 141 and the sum D2 of the widths of the plurality of branch electrodes 14a in any of the other pixel electrodes 14 to satisfy |D1−D2|/D1≤20%, it can be ensured that the width of the first pixel electrode 141 overlapping the first signal line 11 and the width of any of the other pixel electrodes 14 in the second direction Y are the same or similar, and the first pixel electrode 141 does not adjust its width in the second direction Y because of overlapping with the first signal line 11, thereby ensuring good uniformity of the optical and electrical properties of different pixel electrodes and ensuring the display effect.

It can be understood that when the pixel electrode comprises a plurality of branch electrodes, the width of the first pixel electrode 141 in the second direction is the same or similar to that of any of the other pixel electrodes. It can also be understood that the number of the branch electrodes in the first pixel electrode 141 is the same as the number of the branch electrodes in any of the other pixel electrodes.

Figure 5:
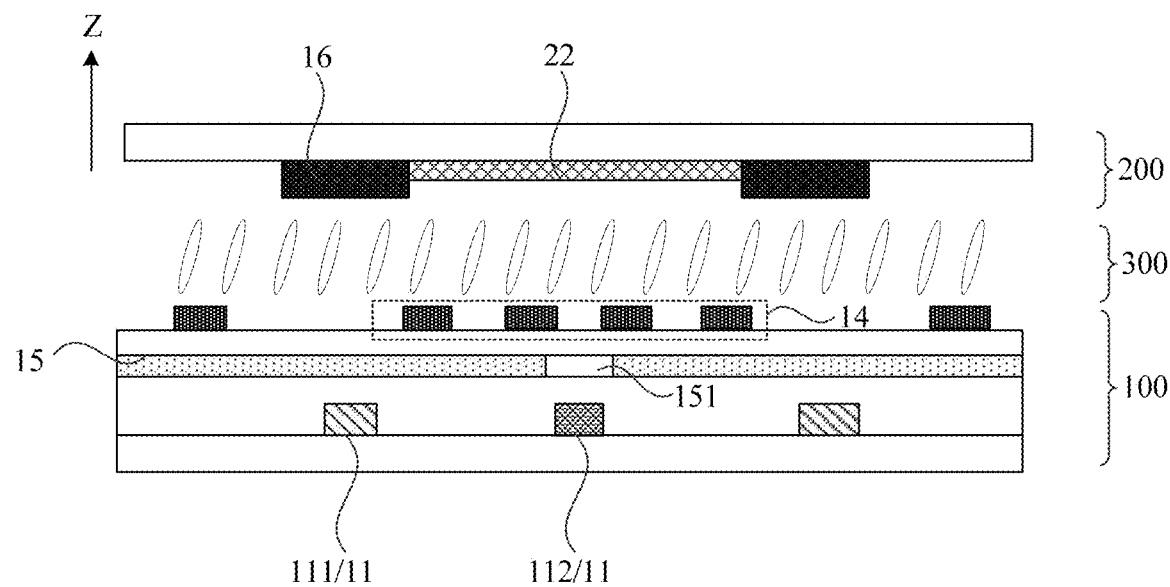
FIG. 5 is a cross sectional schematic structural diagram of a display panel provided by an embodiment of the present application.

Based on the above embodiments, FIG. 5 is a schematic cross-sectional structural diagram of a display panel provided in an embodiment of the present application. As shown in FIG. 5, the display panel further comprises a shielding structure 16. Along the thickness direction of the display panel (the Z direction shown in the figure, the subsequent embodiments are explained using the third direction Z as an example), the shielding structure 16 covers the second signal lines 12 and part of the first signal lines 11.

As shown in FIG. 5, the display panel provided by the embodiment of the present application may further comprise a shielding structure 16 located on a side of the first signal lines 11 and the second signal lines 12 close to a light emitting side of the display panel. Along the thickness direction of the display panel, the shielding structure 16 covers the non-pixel opening area of the display panel. The shielding structure 16 will not affect the normal light output for display of the display panel, and will not affect the display effect of the display panel. Further, the shielding structure covers part of the first signal lines 11, which can be understood as the shielding structure 16 covering the first signal lines 11 located in the gaps between the pixel opening areas 13. The shielding structure 16 is set to cover the second signal lines 12 and part of the first signal lines 11, which can avoid the problem that external ambient light impinges on the first signal lines 11 and the second signal lines 12 to cause the first signal lines 11 and the second signal lines 12 visible because of reflection, and prevent the first signal line 11 and the second signal line 12 from reflecting ambient light to affect the display light of the display panel, thereby ensuring the display effect.

On the basis of the above-mentioned embodiments, referring to FIG. 5, the display panel further comprises an array substrate 100, an opposite substrate 200 and a liquid crystal layer 300 provided between the array substrate 100 and the opposite substrate 200; the array substrate 100 comprises first signal lines 11, second signal lines 12 and pixel electrodes 14, and the opposite substrate 200 comprises a shielding structure 16.

Still referring to FIG. 5, the display panel may comprise an array substrate 100 and an opposite substrate 200, as well as a liquid crystal layer 300 provided between the array substrate 100 and the opposite substrate 200. The array substrate 100 comprises first signal lines 11, second signal lines 12, and pixel electrodes 14. As mentioned above, the first signal lines 11 may include data signal lines 111 and a touch signal line 112, and the second signal lines 12 may include a scan signal line. And as shown in FIG. 5, the array substrate 100 may further comprise a common electrode 15. The common electrode 15 and the pixel electrodes 14 are both arranged in the array substrate 100, that is, arranged on the same side of the liquid crystal layer 300. The liquid crystal molecules in the liquid crystal layer 300 are used to perform in-plane deflection under the horizontal electric field provided by the pixel electrodes 14 and the common electrode 15. Furthermore, along the thickness direction Z of the display panel, the common electrode 15 is located on the side of the pixel electrodes 14 away from the first signal line 11; alternatively, the common electrode 15 is located on the side of the pixel electrodes 14 close to the first signal lines 11. FIG. 5 takes the case where the common electrode 15 is located on the side of the pixel electrodes 14 close to the first signal lines 11 as an example for explanation.

The opposite substrate 200 is provided with a light shielding structure 16 and a color filter structure 22. The light shielding structure 16 covers the second signal lines 12 and part of the first signal lines 11, which can prevent the external ambient light from impinging upon the first signal lines 11 and the second signal lines 12 to cause the first signal lines 11 and the second signal lines 12 visible because of reflection; the color filter structure 22 is used to filter light of a specific color to achieve color display of the display panel. Further, the color filter structure 22 may comprise a red light filter structure to filter out light other than red light, a green light filter structure to filter out light other than green light, and a blue light filter structure to filter out light other than blue light.

It should be noted that, in other technical solutions, the light shielding structure 16 may also be called a black matrix, and the color filter structure 22 may also be called a color film.

As described above, the first signal lines provided in the embodiment of the present application include data signal lines and touch signal lines. The first signal line overlapping with the pixel opening area in the thickness direction of the display panel can be a data signal line or a touch signal line. The technical solution that the first signal lines overlapping with the pixel opening areas are touch signal lines will be described below first.

Still referring to FIGS. 2 and 3, the first signal lines 11 include touch signal lines 112; at least part of the touch signal lines 112 overlap with the pixel opening areas 13 in the thickness direction of the display panel, so that the distance between the data signal line 111 and the touch signal line 112 can be increased, the coupling interference between the data signal line 111 and the touch signal line 112 that are adjacent can be reduced, the signal accuracy of the display signal and the touch signal can be improved, and a good display effect and touch accuracy can be ensured. Besides, by increasing the distance between the data signal line 111 and the touch signal line 112, a short circuit between the adjacent data signal line 111 and the touch signal line 112 can be avoided, the processing difficulty can be reduced, and the manufacturing efficiency can be improved. Moreover, at least part of the touch signal lines 112 overlap with the pixel opening areas 13, and the data signal lines 111 overlap with the gaps between the pixel opening areas 13, so that the area occupied by the gaps between the pixel electrodes 14 can also be reduced, leaving more space for providing the pixel electrodes 14, which is conducive to improving the display resolution of the display panel.

Figure 6:
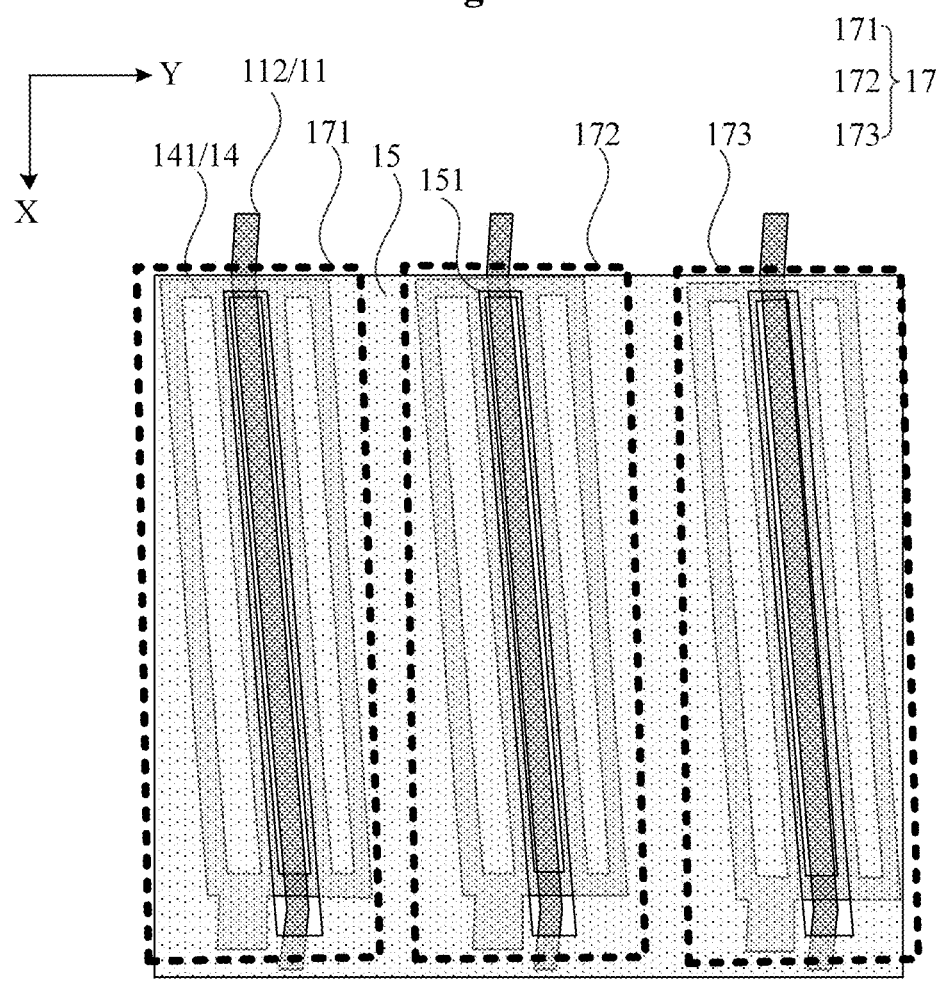
FIG. 6 is a schematic structural diagram of a top view of another display panel provided by an embodiment of the present application.

On the basis of the above embodiments, FIG. 6 is a top view schematic structural diagram of another display panel provided in an embodiment of the present application. Referring to FIGS. 5 and 6 together, the display panel may further comprise a common electrode 15, in which slits 151 are provided; along the thickness direction of the display panel (the Z direction as shown in the figure), the slits 151 overlap with the touch signal lines 112; along the thickness direction of the display panel, any pixel electrode 14 overlaps with the touch signal line 112.

As shown in FIGS. 5 and 6, in order to reduce the interference of touch on the display and to improve the touch performance, it is necessary to reduce the parasitic capacitance between the touch signal lines and the common electrode. Therefore, in the technical solution of the embodiment of the present application, slits 151 are provided in the common electrode 15, and along the thickness direction of the display panel, the slits 151 overlap with the touch signal lines 112, that is, the facing area between the common electrode 15 and the touch signal lines 112 is reduced, and the parasitic capacitance between the common electrode 15 and the touch signal lines 112 is reduced, thereby ensuring that the display performance and touch performance can be improved.

Figure 7:
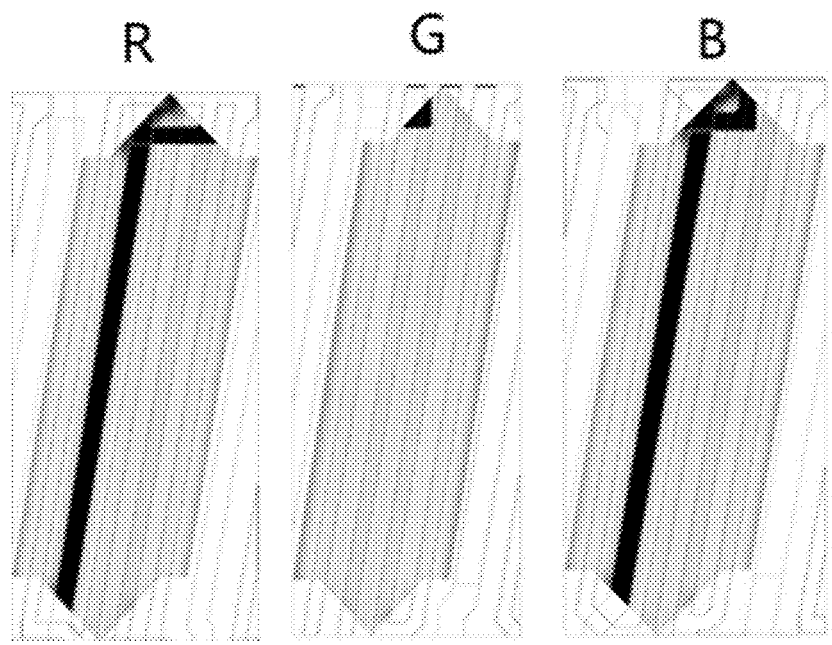
FIG. 7 is a schematic principle diagram showing gaps provided corresponding to red sub-pixels and blue sub-pixels, and no gaps provided for green sub-pixels in the related art.
Figure 8:
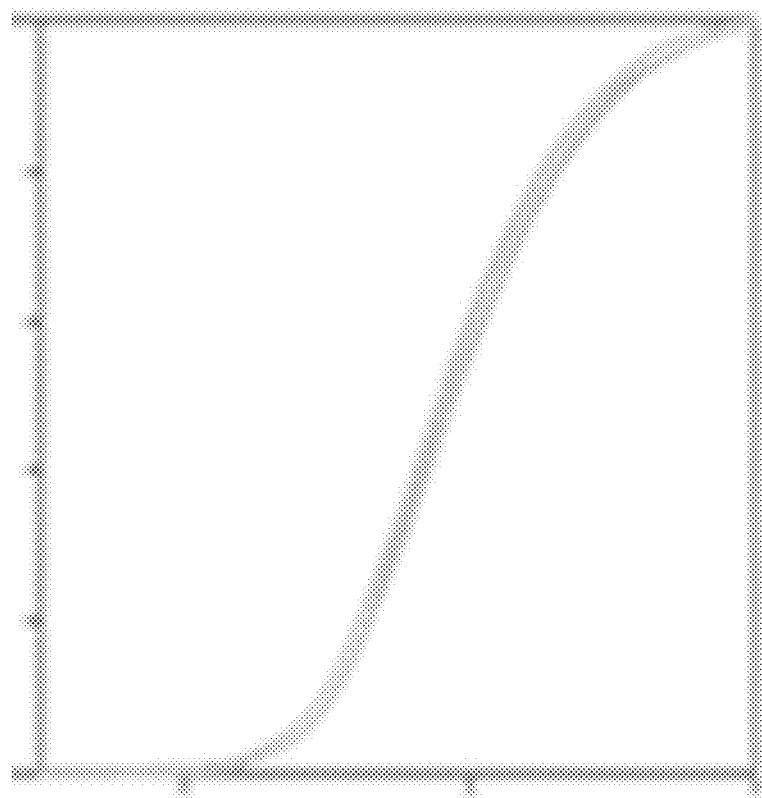
FIG. 8 is a schematic diagram of the display result corresponding to FIG. 7.

Furthermore, the inventors further studied and found that when gaps are provided in the common electrode, visual dark areas will be formed in the areas where the gaps are located during display, and compared with the common electrode provided with no gap, the area of the corresponding common electrode provided with the gaps will be affected, thereby affecting the opening area of the sub-pixel corresponding to the common electrode. In order to ensure that the opening areas of different sub-pixels (sub-pixels corresponding to the gaps and sub-pixels not corresponding to the gaps) are the same or similar, the areas of the common electrode corresponding to different sub-pixels can be adjusted (the "sub-pixel corresponding to the gap" here can be understood as the gap overlapping with the sub-pixel along the thickness direction of the display panel, and the expressions concerning "the sub-pixel corresponding to the gap" in the subsequent context can be understood in this way). For example, for the sub-pixel corresponding to the gap, the area of the common electrode left after removing the area of the gap is the same or similar to the area of the common electrode in the sub-pixel not corresponding to the gap, so as to ensure that the sub-pixels have the same or similar pixel opening regardless of whether the sub-pixels correspond to the gaps or not. For example, a line width of the touch signal line can be 3 m, and a width of the gap in the common electrode overlapping the touch signal line can be 3.5 m. Therefore, during the manufacturing process, the overall covering area of the common electrode provided with the gaps can be appropriately increased to compensate for the area of the common electrode lost due to the gaps. Therefore, when manufacturing the common electrode, the area of the common electrode is adjusted in such a way that the adjustment to the area is determined based on the set width of the gap (for example, 3.5 m), for example, the width of the adjustment value and/or determining the length of the adjustment value is/are determined. However, considering the process fluctuations in the actual manufacturing process of the display panel, the width of the gap cannot be completely guaranteed to be 3.5 m, and the adjustment to the area of the common electrode is a pre-set fixed value that will not change. This will result in the situation that when the actual width of the gap is less than the set width, the area of the common electrode provided with the gap becomes larger, and when the actual width of the gap is greater than the set width, the area of the common electrode provided with the gap becomes smaller, which will also cause the area of the common electrode provided with the gap to be different from the area of the common electrode without the gap, affecting the display brightness of different sub-pixels. For example, when there are gaps in the common electrode that the red sub-pixels correspond to and the common electrode that the blue sub-pixels correspond to, and there are no gaps in the common electrode that the green sub-pixels correspond to, and when the actual widths of the gaps are greater than the set width, the overall light output of the pixel units including the red sub-pixels, the blue sub-pixels and the green sub-pixels is yellowish; when the actual widths of the gaps are less than the set width, the overall light output of the pixel units including the red sub-pixels, the blue sub-pixels and the green sub-pixels is purplish. Therefore, when there are gaps in the common electrode that part of the sub-pixels correspond to and there are no gaps in the common electrode that the other ones of the sub-pixels correspond to, the display will be subjected to color cast due to process fluctuations in the actual manufacturing process, affecting the display effect. Specifically, FIG. 7 is a principle schematic diagram of providing gaps for red sub-pixels and blue sub-pixels, and providing no gap for green sub-pixels in the related art, and FIG. 8 is a schematic diagram of the display result corresponding to FIG. 7. The abscissa of FIG. 8 represents voltage, and the ordinate represents normalized brightness value. As shown in FIGS. 7 and 8, when gaps are provided correspondingly in the red sub-pixels and the blue sub-pixels, and no gap is provided correspondingly in the green sub-pixels, under the same voltage, there are differences in the display brightness of the red sub-pixels, the display brightness of the green sub-pixels, and the display brightness of the blue sub-pixels. It can be seen from the display effect diagram shown in FIG. 8 that the luminous brightness curves of the three sub-pixels do not overlap, resulting in color cast on the display panel, affecting the display effect.

Figure 9:
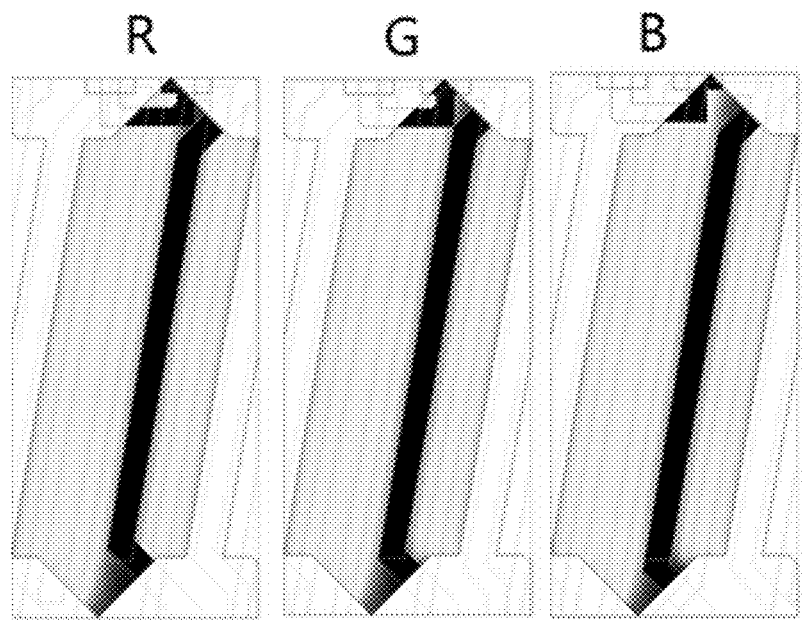
FIG. 9 is a schematic principle diagram showing gaps provided corresponding to red sub-pixels, green sub-pixels and blue sub-pixels in an embodiment of the present application.
Figure 10:
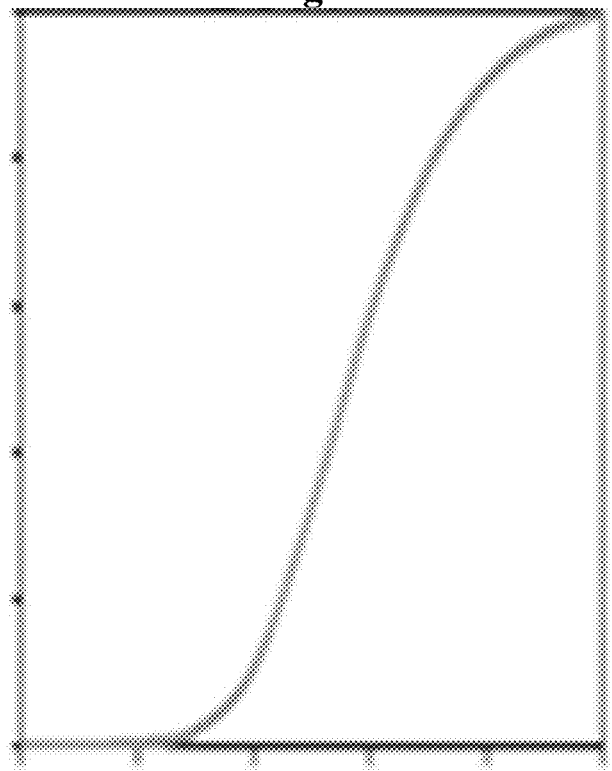
FIG. 10 is a schematic diagram of the display result corresponding to FIG. 9.

Based on the above research findings, the inventors further provide a technical solution in the embodiments of the present application, namely, a solution in which any pixel electrode 14 overlaps with a touch signal line 112 along the thickness direction of the display panel, that is, the touch signal line 112 is correspondingly provided in each of the sub-pixels, and the gap 151 is provided in the common electrode 15 that each of the sub-pixels corresponds to, so that when the area of the gap is different from the set value due to process fluctuations in the actual manufacturing process, the differences corresponding to any two sub-pixels are the same, so that the areas of the common electrodes that any two sub-pixels correspond to remain the same, and the opening areas of different sub-pixels can be guaranteed to be the same, so there will be no display color cast problem caused by different common electrode areas, thereby ensuring the display effect of the display panel. Specifically, FIG. 9 is a schematic principle diagram of providing gaps corresponding to red sub-pixels, green sub-pixels and blue sub-pixels in an embodiment of the present application, and FIG. 10 is a schematic diagram of the display result corresponding to FIG. 9, in which the abscissa represents voltage, and the ordinate represents normalized brightness value. As shown in FIGS. 9 and 10, when gaps are correspondingly provided in the red sub-pixels, the green sub-pixels and the blue sub-pixels each, under the same voltage, there is no or just small difference among the display brightness of the red sub-pixel, the display brightness of the green sub-pixel and the display brightness of the blue sub-pixel. It can be seen from the display effect diagram shown in FIG. 10 that the luminous brightness curves of the three sub-pixels overlap or approximately overlap, ensuring that the display panel will not have a display color cast and ensuring a good display effect.

On the basis of the above-mentioned embodiment, referring to FIG. 6, the display panel further comprises a plurality of pixel units 17, each comprising a first color sub-pixel 171, a second color sub-pixel 172 and a third color sub-pixel 173 arranged along the second direction Y; along the thickness direction of the display panel, the pixel electrode 14 in the first color sub-pixel 171, the pixel electrode 14 in the second color sub-pixel 172 and the pixel electrode 14 in the third color sub-pixel 173 overlap with the touch signal lines 112 each.

Specifically, the display panel comprises a plurality of pixel units 17 arranged in an array to realize normal display of the display panel. As a feasible setting manner, the display unit 17 has a first color sub-pixel 171, a second color sub-pixel 172, and a third color sub-pixel 173 arranged along the second direction Y, and the colors of light emitted by the first color sub-pixel 171, the second color sub-pixel 172, and the third color sub-pixel 173 are different. For example, the first color sub-pixel 171 can be a red sub-pixel, the second color sub-pixel 172 can be a blue sub-pixel, and the third color sub-pixel 173 can be a green sub-pixel. The combination of the three color sub-pixels can realize the color display effect of the display panel.

The pixel electrode 14 in the first color sub-pixel 171, the pixel electrode 14 in the second color sub-pixel 172 and the pixel electrode 14 in the third color sub-pixel 173 overlap with the touch signal lines 112 each, that is, each of the sub-pixels of different light-emitting colors is provided with the touch signal line 112 correspondingly, that is, the common electrode 15 that each of the sub-pixels corresponds to is provided with the gap 151, so that when the area of the gap is different from the set value due to process fluctuations in the actual manufacturing process, the differences corresponding to any two sub-pixels are the same, so that the areas of the common electrodes that any two sub-pixels correspond to remain the same, and the opening areas of different sub-pixels can be guaranteed to be the same, so there will be no display color cast problem caused by different common electrode areas, thereby ensuring the display effect of the display panel.

On the basis of the above embodiment, referring to FIG. 2, the first signal lines 11 further comprises data signal lines 111; along the second direction Y, the data signal lines 111 and the touch signal lines 112 are arranged alternately in sequence; along the second direction Y, the distances between the touch signal line 112 and two data signal lines 111 adjacent to it are L1 and L2, respectively, wherein $|L1-L2|/L1 \leq 20\%$; along the second direction Y, the distances between the data signal line 111 and two touch signal lines 112 adjacent to it are L3 and L4, respectively, wherein $|L3-L4|/L3 \leq 20\%$.

Specifically, the first signal lines 11 may further comprise data signal lines 111, and the display panel may further comprise pixel circuits, each of which comprises a transistor 18 comprising a source, a gate and a drain. The source is electrically connected with the data signal line 111, the gate is electrically connected with the scanning signal line 12, and the drain is electrically connected with the pixel electrode 14. In this way, under the action of the scanning signal provided by the scanning signal line 12, the data signal in the data signal line 111 is transmitted to the pixel electrode 14 via the source and the drain to provide a display signal for the pixel electrode 14. In this way, the liquid crystal molecules can be deflected under the action of the electric field formed by the pixel electrode 14 and the common electrode 15, thereby achieving the display effect of the display panel.

Still referring to FIG. 2, the data signal line 111 is arranged between two adjacent columns of pixel electrodes 14, the touch signal line 112 overlaps with the pixel electrode 14, and the data signal lines 111 and the touch signal lines 112 are arranged alternately. Along the second direction Y, the distances between any touch signal line 112 and the two data signal lines 111 arranged adjacent to it are L1 and L2, respectively, wherein $|L1-L2|/L1 \leq 20\%$, that is, the distances between any touch signal line 112 and the two data signal lines 111 arranged adjacent to it are the same or similar, so that the larger distances between the touch signal line 111 and the two data signal lines 111 adjacent to it can be ensured, reducing the interference of the touch signal transmitted in the touch signal line 112 on the data signal transmitted in the data signal line 111, improving the accuracy of the data signal, and guaranteeing the display effect is guaranteed. Furthermore, along the second direction Y, the distances between any data signal line 111 and two touch signal lines 112 adjacent to it are L3 and L4 respectively, wherein $|L3-L4|/L3 \leq 20\%$, i.e., the distances between any data signal line 111 and two touch signal lines 112 adjacent to it are the same or similar, so that the larger distances between the data signal line 111 and the two touch signal lines 112 adjacent to it can be ensured, reducing the interference of the data signal transmitted in the data signal line 111 on the touch signal transmitted in the touch signal line 112, improving the accuracy of the touch signal, and guaranteeing the touch sensitivity.

On the basis of the above embodiment, still referring to FIG. 2, the first pixel electrode 141 comprises at least two branch electrodes 14a connected with each other and at least one hollow portion 14b located between two adjacent branch electrodes 14a. Along the thickness direction of the display panel, the hollow portion 14b overlaps with the touch signal line 112.

Specifically, the pixel electrode 14 comprises a plurality of branch electrodes 14a extending along the first direction X and being arranged along the second direction Y, and a hollow portion 14b exists between two branch electrodes 14a adjacently arranged along the second direction Y The plurality of branch electrodes 14a are connected together at the end of the pixel electrode 14 along the first direction X to form a pixel electrode of the same potential. By providing the pixel electrode 14 comprising a plurality of branch electrodes 14a, it is ensured that a deflection electric field of liquid crystal molecules is formed between the pixel electrode 14 and the common electrode 15, while ensuring the light transmittance of the pixel electrode 14, thereby improving the display brightness of the liquid crystal display panel.

Furthermore, along the thickness direction of the display panel, the hollow portion 14b overlaps with the touch signal line 112, which can reduce the facing area of the touch signal line 112 and the pixel electrode 14, reducing the parasitic capacitance between the touch signal line 112 and the pixel electrode 14, and reducing the coupling interference between the touch signal and the display signal, thereby ensuring the normal display function and touch effect of the display panel.

In summary, the above embodiments are described in detail taking for example the touch signal line overlapping with the pixel electrode. By providing the touch signal line overlapping with the pixel electrode, the distance between the touch signal line and the data signal line can be reduced, so that the coupling interference between the touch signal line and the data signal line is reduced, the signal accuracy of the display signal and the touch signal is improved, and a good display effect and touch accuracy can be ensured; moreover, the process difficulty can be reduced to ensure the improvement of the manufacturing efficiency. In addition, a gap is provided in the common electrode where the touch signal line overlaps with it, which can reduce the parasitic capacitance between the touch signal line and the common electrode and ensure the improvement of the display performance and touch performance. Furthermore, any touch signal line is set to overlap with a pixel electrode for providing touching control, that is, the touch signal line is provided in each of the sub-pixels, i.e., the gap is provided in the common electrode that each of the sub-pixels corresponds to, so that when the area of the gap is different from the set value due to the process fluctuations in the actual manufacturing process, the differences corresponding to any two sub-pixels are the same, so that the areas of the common electrodes that any two sub-pixels correspond to remain the same, ensuring that the opening areas of different sub-pixels are the same, and ensuring the display effect of the display panel.

Next, the technical solution that the first signal line overlapping with the pixel opening area is a data signal line is described.

Continuing to refer to FIG. 4, the first signal line 11 comprises a data signal line 111; along the thickness direction of the display panel, at least part of the data signal lines 111 overlap with the pixel opening area 13, so that the distance between the data signal line 111 and the touch signal line 112 can be increased, the coupling interference between the adjacent data signal line 111 and the touch signal line 112 can be reduced, the signal accuracy of the display signal and the touch signal can be improved, and a good display effect and touch accuracy can be ensured. In addition, by increasing the distance between the data signal line 111 and the touch signal line 112, a short circuit between the adjacent data signal line 111 and the touch signal line 112 can be avoided, the process difficulty can be reduced, and the manufacturing efficiency can be improved. Moreover, at least part of the data signal lines 111 overlap with the pixel opening area 13, and the touch signal line 112 overlaps with the gap between the pixel opening areas 13, the area occupied by the gap between the pixel electrodes 14 can further be reduced, so as to leave more space for providing the pixel electrode 14, which is conducive to improving the display resolution of the display panel.

On the basis of the above embodiment, with reference to FIG. 4, along the thickness direction of the display panel, at least part of the pixel electrodes 14 overlap with the data signal line 111.

Specifically, at least part of the pixel electrodes 14 overlap with the data signal line 111, that is, part of the pixel electrodes 14 overlap with the data signal line 111, or any one of the pixel electrodes 14 overlaps with the data signal line 111. When the data signal line 111 overlaps with the pixel electrode 14, the data signal line 111 may be electrically connected with the pixel electrode 14 overlapped therewith via a pixel circuit to provide a data signal to the pixel electrode 14 overlapped therewith.

It should be noted that in the solution where the touch signal line 112 overlaps with the pixel electrode 14, in order to ensure that the areas of the common electrodes that the sub-pixels of different luminous colors correspond to are the same, any pixel electrode 14 needs to correspond to a touch signal line 112. Different from the above solution, in the solution where the data signal line 111 overlaps with the pixel electrode 14, at least part of the pixel electrodes 14 overlap with the data signal lines 111, that is, there may be part of the pixel electrodes 14 overlapping with a data signal line 111, and part of the pixel electrodes 14 not overlapping with a data signal line 111, as shown in FIG. 4. The reason is explained in detail in the following embodiments.

Figure 11:
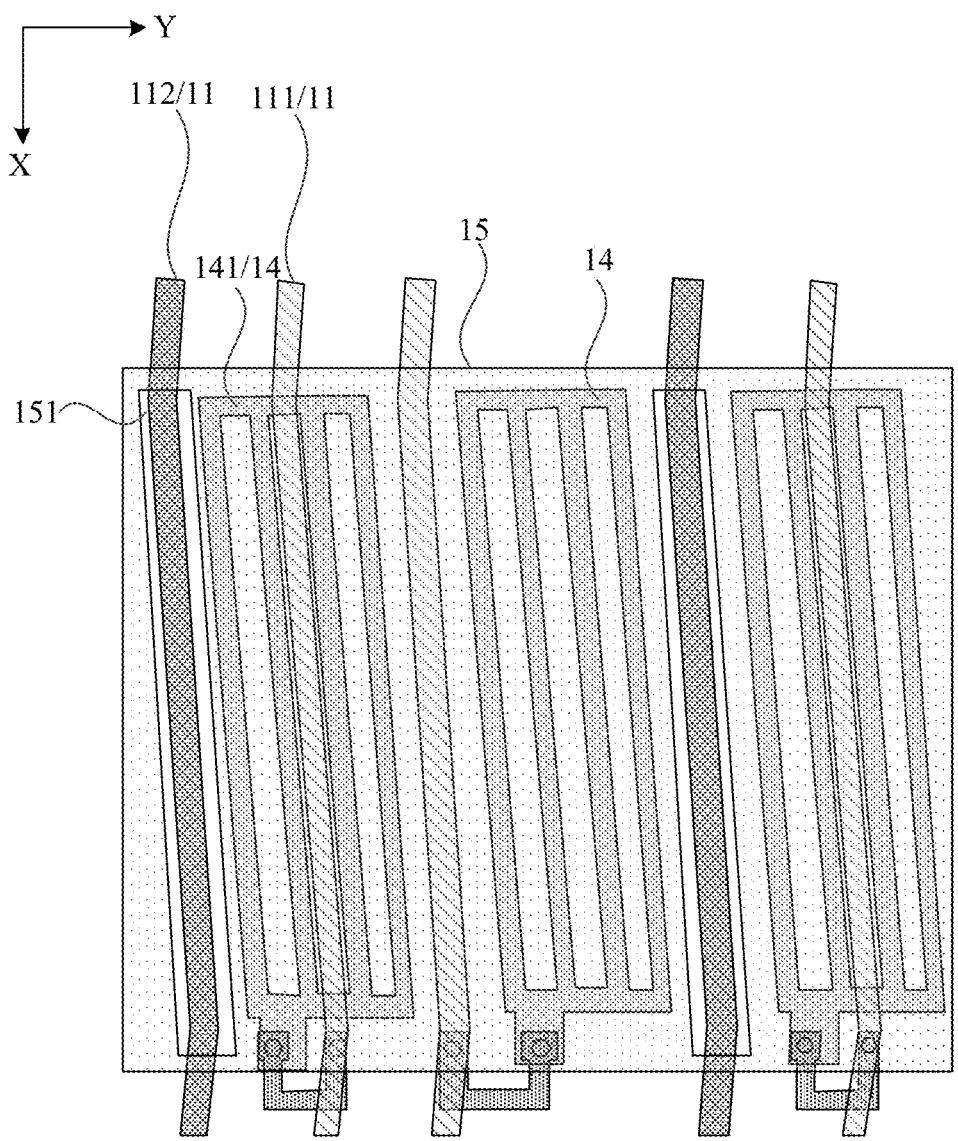
FIG. 11 is a schematic structural diagram of a top view of another display panel provided by an embodiment of the present application.

Furthermore, FIG. 11 is a top view structural schematic diagram of another display panel provided by an embodiment of the present application. As shown in FIG. 11, the first signal lines 11 further includes a touch signal line 112 located between two adjacent columns of pixel electrodes 14; the display panel further comprises a common electrode 15, and a gap 151 is provided in the common electrode 15; along the thickness direction of the display panel, the gap 151 overlaps with the touch signal line 112.

As shown in FIG. 11, the first signal lines 11 may include touch signal lines 112 in addition to the data signal lines 111. Along the thickness direction of the display panel, at least part of the data signal lines 111 overlap with the pixel electrodes 14, and the touch signal line is located between two adjacent columns of pixel electrodes 14. In this way, the distance between the data signal line 111 and the touch signal line 112 can be increased, the coupling interference between the adjacent data signal line 111 and the touch signal line 112 can be reduced, the signal accuracy of the display signal and the touch signal can be improved, and a good display effect and touch accuracy can be ensured. In addition, by increasing the distance between the data signal line 111 and the touch signal line 112, a short circuit between the adjacent data signal line 111 and the touch signal line 112 can be avoided, the process difficulty can be reduced, and the manufacturing efficiency can be improved. Moreover, at least part of the data signal lines 111 overlap with the pixel opening areas 13, and the touch signal lines 112 overlap with the gaps between the pixel opening areas 13, which can also reduce the area occupied by the gaps between the pixel electrodes 14 to leave more space for providing the pixel electrodes 14, which is beneficial to improving the display resolution of the display panel.

Furthermore, in order to reduce the interference of touching on the display and to improve the touch performance, it is necessary to reduce the parasitic capacitance between the touch signal line and the common electrode. Therefore, in the technical solution of the embodiment of the present application, a gap 151 is provided in the common electrode 15, and along the thickness direction of the display panel the gap 151 overlaps with the touch signal line 112, that is, the facing area between the common electrode 15 and the touch signal line 112 is reduced, and the parasitic capacitance between the common electrode 15 and the touch signal line 112 is reduced, thereby ensuring that the display performance and touch performance can be improved.

As the touch signal line 112 is located between two adjacent columns of pixel electrodes 14, the gap 151 in the common electrode 15 corresponds to the area between two adjacent columns of pixel electrodes 14, that is, it corresponds to the non-opening area of the sub-pixel, rather than the opening area of the sub-pixel. There is a complete and seamless common electrode in the opening area of the sub-pixel. In this way, even if there are process fluctuations in the manufacturing process of the gap 151, whether the width of the gap 151 is too large or too small will not affect the area of the common electrode that the sub-pixel opening area corresponds to. It can be ensured that different sub-pixels have the same or similar pixel opening areas, and that different sub-pixels maintain the same or similar display brightness under the action of the same data signal. In this way, the display panel will not have color cast, and a normal color display effect can be guaranteed.

Therefore, when the touch signal line 112 is located between two adjacent columns of pixel electrodes 14, and the gap 151 is provided in the common electrode 15 corresponding to the touch signal line 112, whether the pixel opening area 13 is provided with a data signal line 111 or not, there will be no brightness difference for different sub-pixels. Therefore, in this case, there is no strict limitation on whether any pixel electrode 14 needs to overlap with a data signal line 111, that is, the situation described in the above embodiment that some pixel electrodes 14 may overlap with the data signal lines 111, and some pixel electrodes 14 may not overlap with the data signal lines 111. In the panel structure, at least some pixel electrodes 14 may be arranged to overlap with the data signal line 111 according to actual requirements.

In summary, the above embodiments are described in detail taking for example the data signal line overlapping with the pixel electrode. By providing the data signal line overlapping with the pixel electrode, the distance between the touch signal line and the data signal line can be reduced, so that the coupling interference between the touch signal line and the data signal line is reduced, the signal accuracy of the display signal and the touch signal is improved, and a good display effect and touch accuracy can be ensured; moreover the process difficulty can be reduced to ensure the improvement of the manufacturing efficiency. In addition, a gap is provided in the common electrode where the touch signal line overlaps with it, which can reduce the parasitic capacitance between the touch signal line and the common electrode, and ensure the improvement of the display performance and touch performance. Furthermore, at least part of the pixel electrodes can be arranged to overlap with the data signal lines instead of requiring any one of the pixel electrodes to overlap with a data signal line, so the correspondence of the data signal lines and the pixel electrodes is relatively flexible. According to actual needs, part of the pixel electrodes are arranged to overlap with the data signal lines, and part of the pixel electrodes are not. Alternatively, according to actual needs, any pixel electrode is arranged to overlap with a data signal lines. In this way, even if the area of the gap is different from the set value due to the process fluctuations in the actual manufacturing process, it can still be ensured that the areas of the common electrodes that any two sub-pixels correspond to remain the same, thereby ensuring that the opening areas of different sub-pixels are the same, and ensuring the display effect of the display panel.

Next, other configuration of the first signal line are described.

Figure 12:
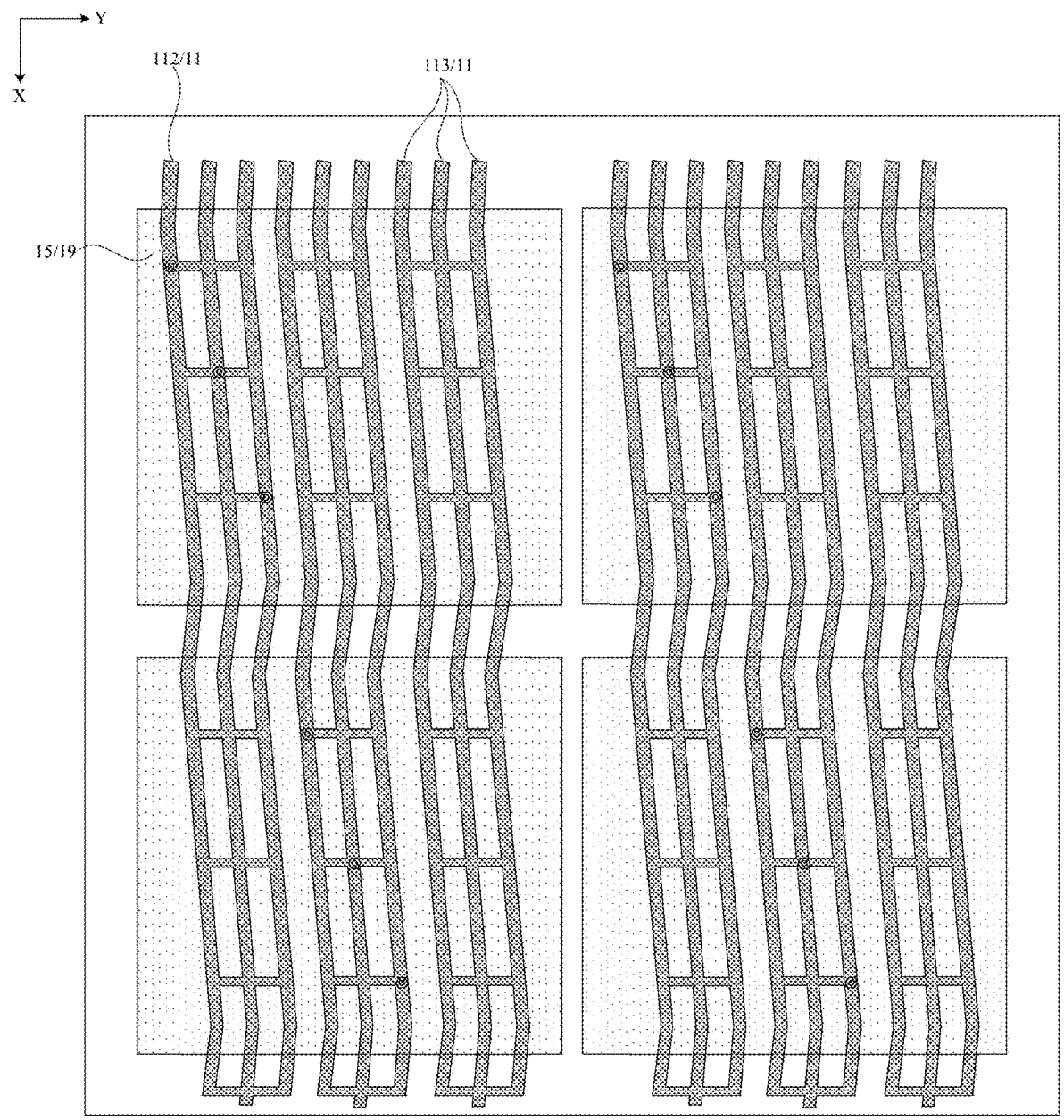
FIG. 12 is a schematic structural diagram of a top view of another display panel provided by an embodiment of the present application.
Figure 13:
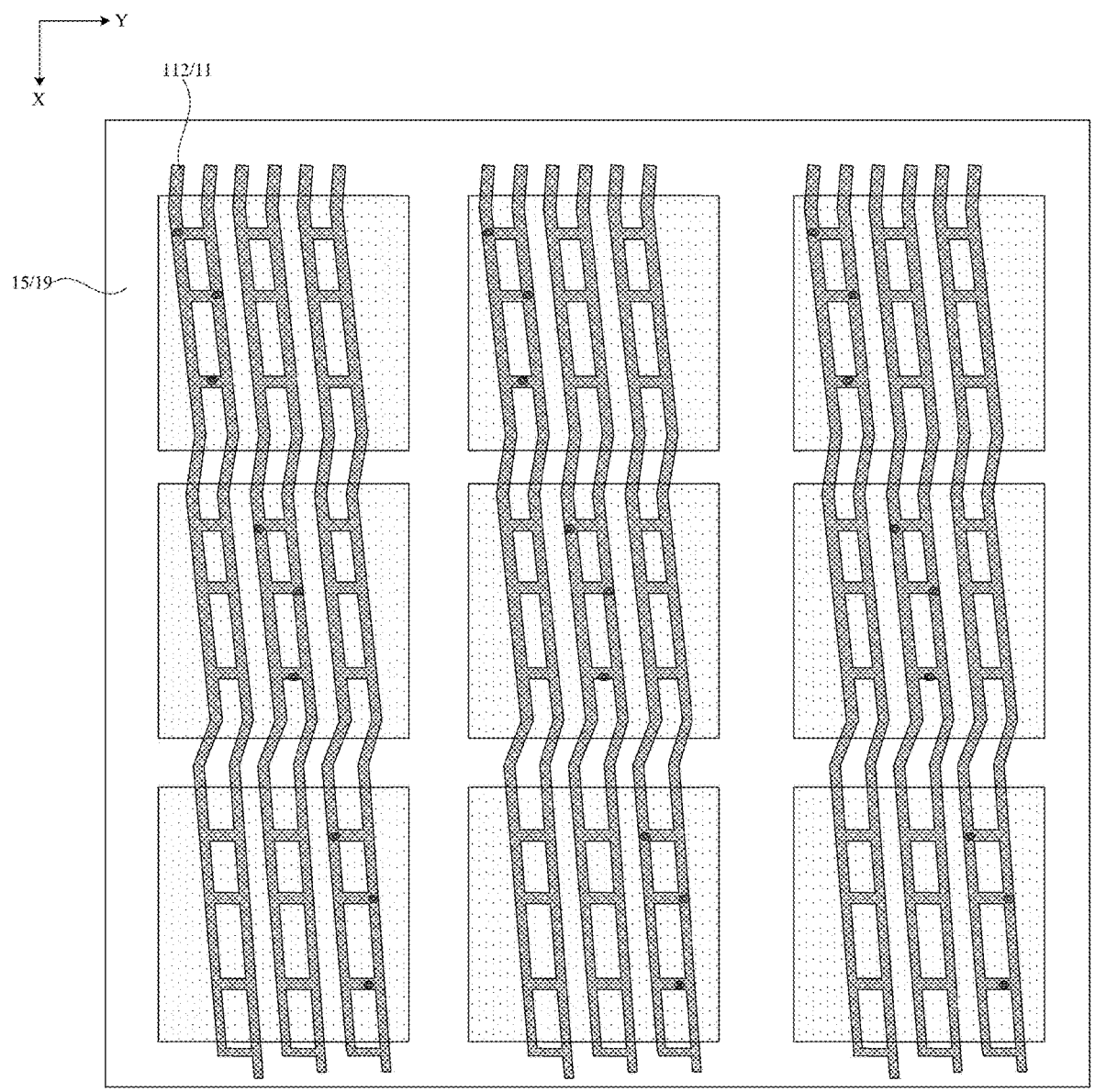
FIG. 13 is a schematic structural diagram of a top view of another display panel provided by an embodiment of the present application.
Figure 14:
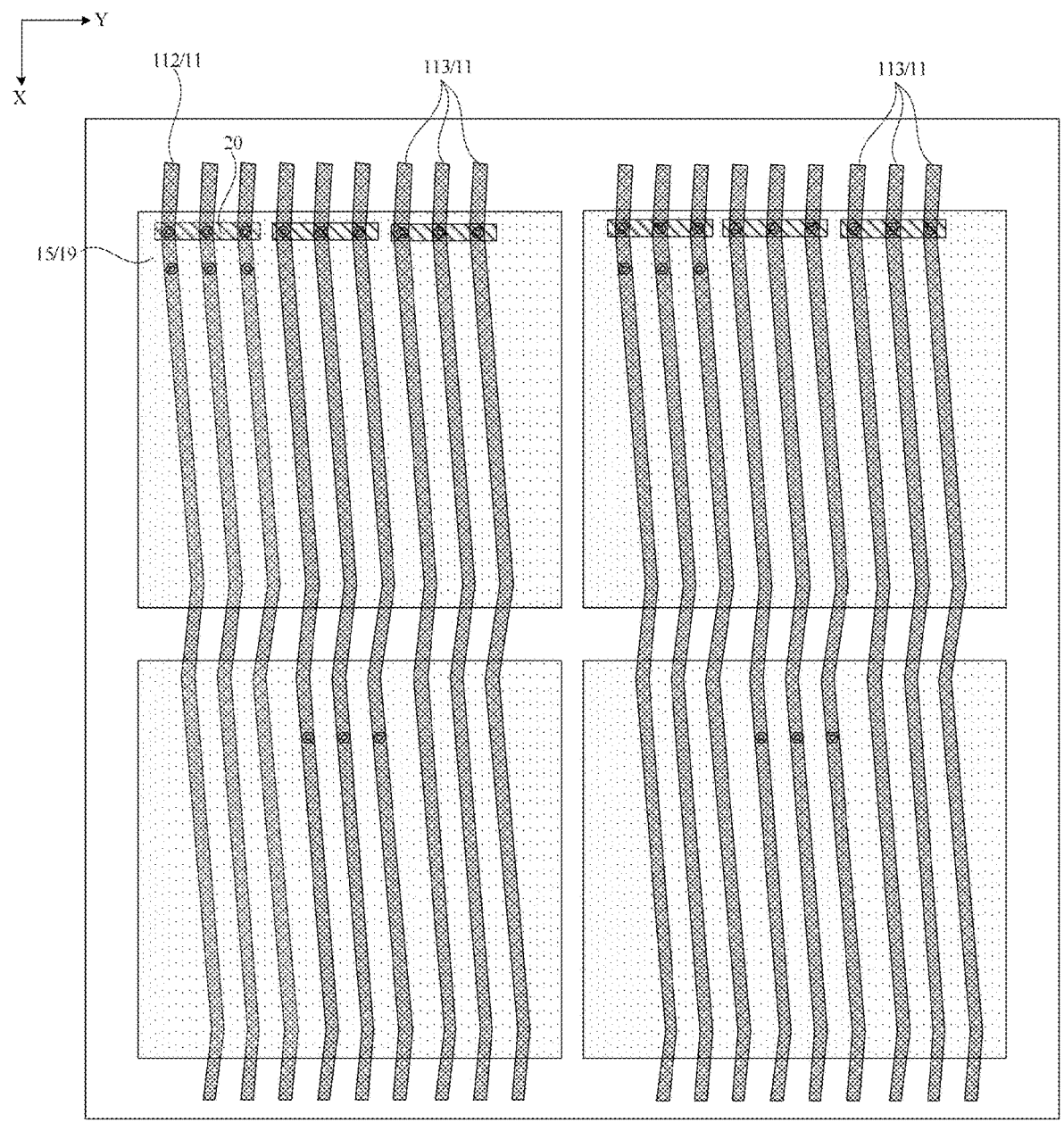
FIG. 14 is a schematic structural diagram of a top view of another display panel provided by an embodiment of the present application.

FIG. 12 is a schematic structural diagram of a top view of another display panel provided in an embodiment of the present application, FIG. 13 is a schematic structural diagram of a top view of another display panel provided in an embodiment of the present application, and FIG. 14 is a schematic structural diagram of a top view of another display panel provided in an embodiment of the present application. As shown in FIGS. 12, 13 and 14, the display panel further comprises touch electrodes 19, and the first signal lines 11 include touch signal lines 112; the same touch electrode 19 is electrically connected with at least two touch signal lines 112.

As shown in FIGS. 12, 13 and 14, the display panel provided by the embodiment of the present application may further comprise touch electrodes 19 each being electrically connected with a touch signal line 112 to receive a touch driving signal provided by the touch signal line 112 and feed back a touch sensing signal to the touch signal line 112 based on a touch operation. The touch signal line 112 transmits the touch sensing signal to the touch chip (not shown in the figure), so that the touch chip recognizes the touch operation. Further, the same touch electrode 19 is electrically connected with at least two touch signal lines 112, that is, at least two touch signal lines 112 are arranged in parallel to provide the touch driving signal to the touch electrode 19 and receive the touch sensing signal at the same time, so as to reduce the loss of the touch driving signal and the touch sensing signal in the transmission process, improve the signal accuracy of the touch driving signal and the touch sensing signal, and further improve the touch sensitivity; when one of the touch signal lines 112 is disconnected, it will not affect the normal transmission of the touch signal. Taking FIG. 12 as an example, the same touch electrode 19 is electrically connected with three touch signal lines 112, which may be the touch signal lines corresponding to three sub-pixels in the same pixel unit, and may correspond to the situation where the touch signal lines overlap with the pixel electrode. Of course, the three touch signal lines may also be touch signal lines corresponding to three sub-pixels in different pixel units, and the embodiment of the present application does not limit this. Taking FIG. 13 as an example, the same touch electrode 19 is electrically connected with two touch signal lines 112, which may be touch signal lines corresponding to two sub-pixels in the same pixel unit, and may correspond to the situation where the data signal line overlaps with the pixel electrode and the touch signal line is located between the pixel opening areas. Of course, the two touch signal lines may also be touch signal lines corresponding to two sub-pixels in different pixel units, and the embodiment of the present application does not limit this.

Continuing to refer to FIGS. 12, 13 and 14, the touch electrode provided in the embodiment of the present application can be a self-capacitive touch electrode, that is, the touch position and/or touch pressure is sensed by the change of the capacitance between the touch electrode and the touch subject (such as a touch finger or a stylus). In addition, in the self-capacitive touch solution, the touch driving signal and the touch sensing signal are transmitted in time-sharing via the same touch signal line, and the touch chip determines the touch position and/or touch pressure based on the difference between the touch driving signal and the touch sensing signal. In the self-capacitive touch solution, the touch electrode 19 can reuse the common electrode 15, that is, the common electrode receives the common voltage signal in the display stage, and together with the pixel electrode drives the liquid crystal to deflect; receives the touch driving signal and feeds back the touch sensing signal in the touch detection stage to realize the sensing of the touch position and/or touch pressure. Providing the touch electrode 19 reusing the common electrode 15 can simplify the film structure of the display panel and realize a display panel with a thin design.

Further, referring to FIG. 14, the display panel provided by the embodiment of the present application may further comprise a touch connection portion 20, and at least two touch signal lines 112 electrically connected with the same touch electrode 19 are electrically connected via the touch connection portion 20; the touch connection portion 20 extends along the second direction Y and arranged on the same layer with the second signal line.

As shown in FIG. 14, the display panel provided by the embodiment of the present application may further comprise a touch connection portion 20, and at least two touch signal lines 112 electrically connected with the same touch electrode 19 are electrically connected via the touch connection portion 20, so that at least two touch signal lines 112 are arranged in parallel, and the touch driving signal is provided to the touch electrode 19 and the touch sensing signal is received at the same time. Since the plurality of touch signal lines 112 are arranged along the second direction, the touch connection portion 20 extending along the second direction Y ensures the size of the touch connection portion 20 to be small on the basis of ensuring the electrical connection with at least two touch signal lines 112. In addition, as shown in FIG. 14, at least two touch signal lines 112 electrically connected with the same touch electrode 19 can be connected via the same touch connection portion 20, so as to simply provide the touch connection portion 20.

Furthermore, since the second signal line extends along the second direction Y, the touch connection portion 20 is arranged on the same layer as the second signal line, which can simplify the film layer structure of the display panel and avoid short circuit between the touch connection portion 20 and the second signal line, thereby ensuring normal transmission of signals in different signal lines in the display panel.

Figure 15:
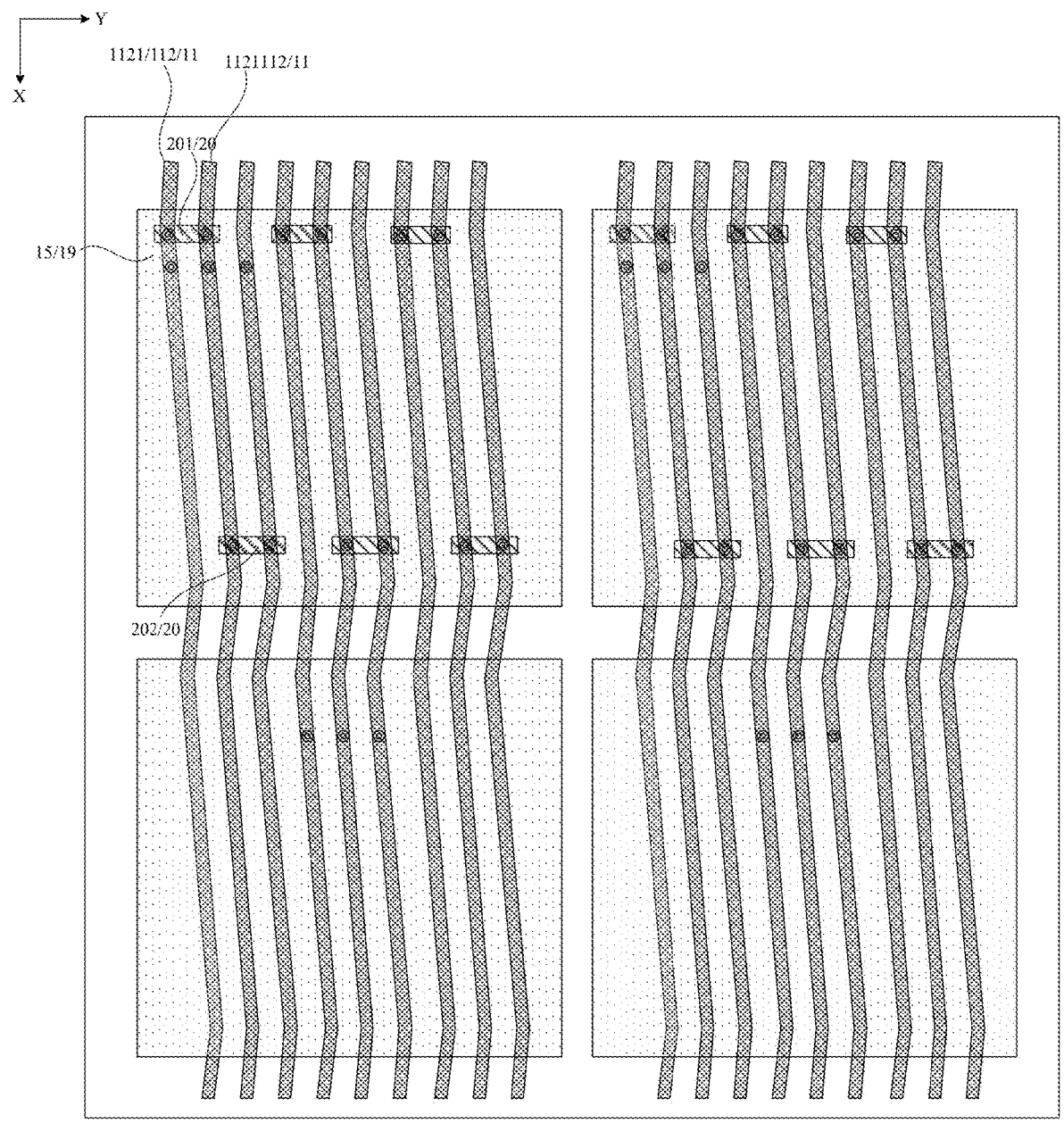
FIG. 15 is a schematic structural diagram of a top view of another display panel provided by an embodiment of the present application.

On the basis of the above-mentioned embodiment, FIG. 15 is a schematic structural diagram of a top view of another display panel provided by an embodiment of the present application. As shown in FIG. 15, the same touch electrode 19 is electrically connected with at least three touch signal lines 112. FIG. 15 only takes the same touch electrode 19 being electrically connected with three touch signal lines 112 as an example for illustration. The at least three touch signal lines 112 electrically connected with the same touch electrode 19 include a first touch signal line 1121, a second touch signal line 1122, and a third touch signal line 1123 all arranged along the second direction; the touch connection portions 20 include at least a first connection portion 201 and a second connection portion 202 located between different rows of the pixel electrodes; the first connection portion 201 electrically connects the first touch signal line 1121 and the second touch signal line 1122, and the second connection portion 202 electrically connects the second touch signal line 1122 and the third touch signal line 1123.

FIG. 14 illustrates an example in which at least two touch signal lines 112 electrically connected with the same touch electrode 19 are connected via the same touch connection portion 20, and FIG. 15 illustrates an example in which at least three touch signal lines 112 electrically connected with the same touch electrode 19 are connected via different touch connection portions. Specifically, as shown in FIG. 15, at least three touch signal lines 112 electrically connected with the same touch electrode 19 comprise a first touch signal line 1121, a second touch signal line 1122 and a third touch signal line 1123 all arranged along the second direction, and the touch connection portions 20 comprises at least a first connection portion 201 and a second connection portion 202. The first connection portion 201 is arranged between two rows of the pixel electrodes (not shown in the figure) and electrically connects the first touch signal line 1121 and the second touch signal line 1122, and the second connection portion 202 is arranged between another two rows of the pixel electrodes and electrically connects the second touch signal line 1122 and the third touch signal line 1123. In this way, the touch connection portion 20 may be provided in various manners, which can be flexibly adjusted according to needs in the actual structure.

It should be noted that a row of the pixel electrodes can be understood as a plurality of pixel electrodes arranged along the second direction Y forming a whole row of the pixel electrodes.

Figure 16:
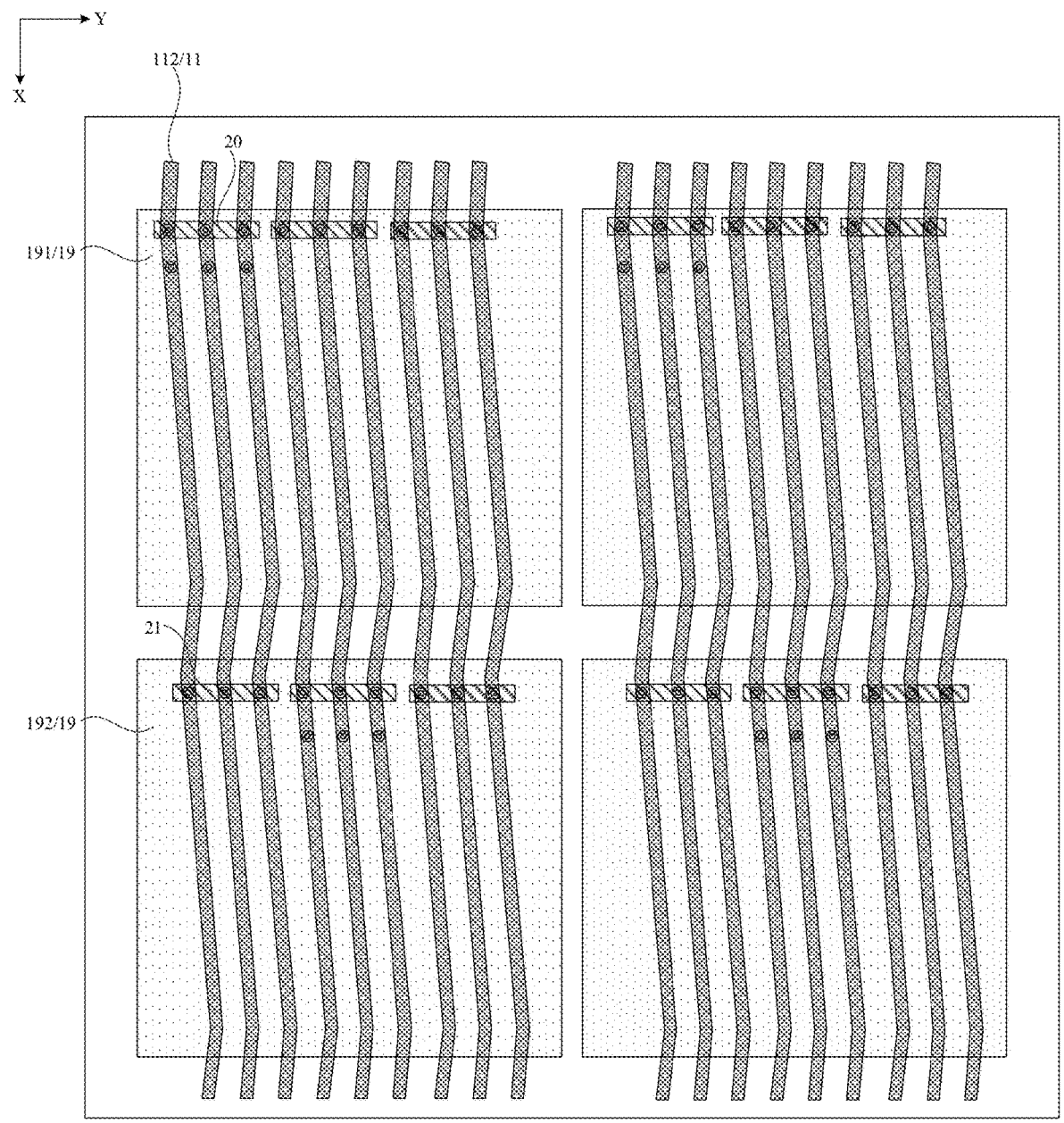
FIG. 16 is a schematic structural diagram of a top view of another display panel provided by an embodiment of the present application.

On the basis of the above embodiments, FIG. 16 is a schematic structural diagram of a top view of another display panel provided by an embodiment of the present application. As shown in FIG. 16, the display panel further comprises a dummy touch connection portion 21; the touch electrodes 19 includes first touch electrodes 191 and second touch electrodes 192 arranged along the first direction X, and at least two touch signal lines 112 electrically connected with the first touch electrodes 191 are electrically connected via the dummy touch connection portion 21 and the touch connection portion 20; along the thickness direction of the display panel, the first touch electrodes 191 covers the touch connection portion 20, and the second touch electrodes 192 covers the dummy touch connection portion 21.

Specifically, as shown in FIG. 16, at least two touch signal lines 112 electrically connected with the first touch electrode 191 are electrically connected via the touch connection portion 20 and the dummy touch connection portion 21, respectively, that is, at least two touch signal lines 112 electrically connected with the first touch electrode 191 can be connected in parallel at multiple positions, which ensures the stability and reliability of the parallel connection, and improves the uniformity of the touch connection portion in the entire display area. Further, along the thickness direction of the display panel, the first touch electrode 191 covers the touch connection portion 20, the second touch electrode 192 covers the dummy touch connection portion 21, and the touch connection portion 20 and the dummy touch connection portion 21 can be provided in the same layer and have the same or similar areas, so that for any touch electrode, there is a touch connection portion corresponding to it, so that the providing of the touch connection portion has the same influence on different touch electrodes, including the influence on optical performance and the influence on electrical performance, thereby ensuring the stability of the touch function.

Figure 17:
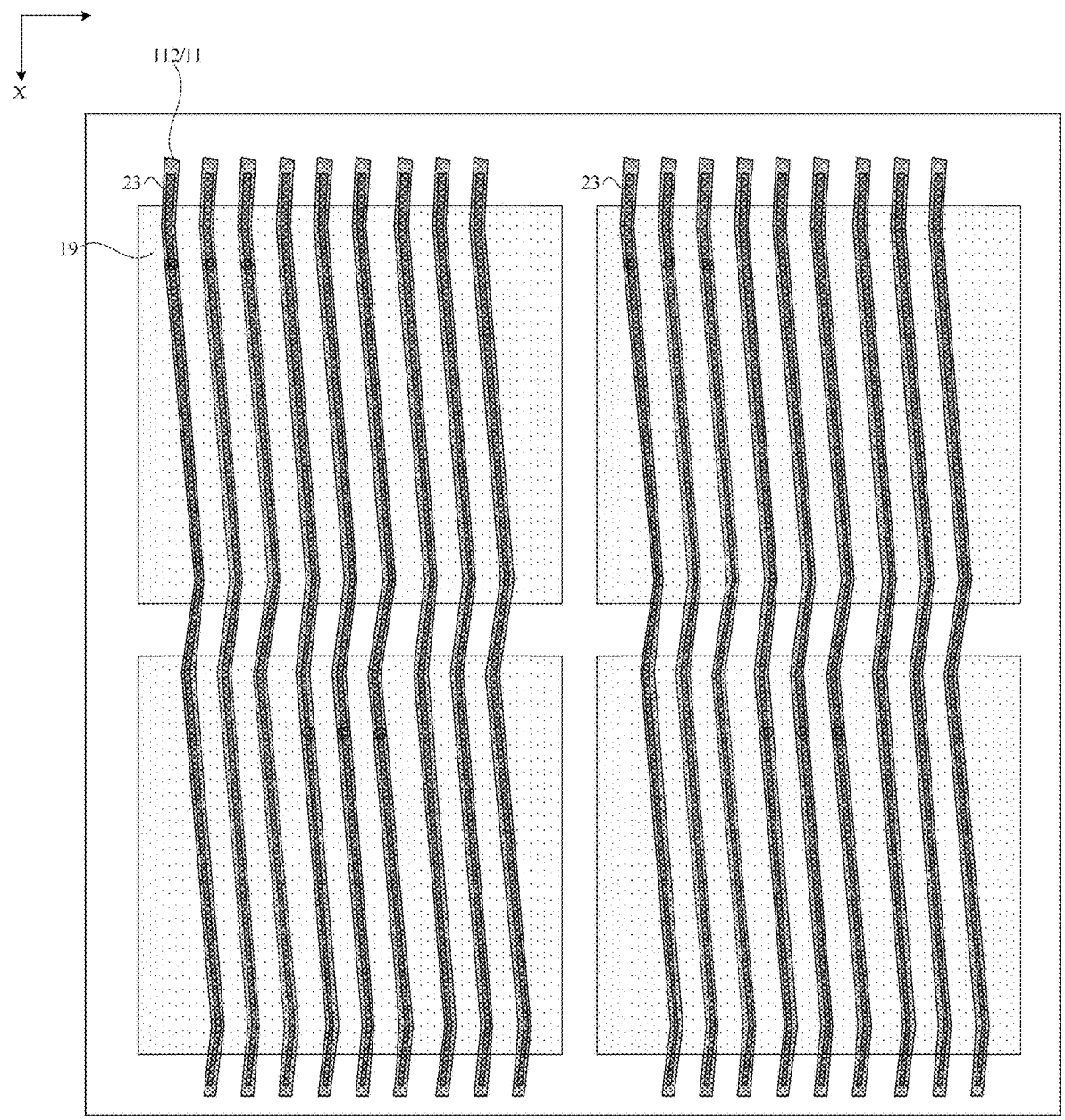
FIG. 17 is a schematic structural diagram of a top view of another display panel provided by an embodiment of the present application.

On the basis of the above embodiments, FIG. 17 is a schematic structural diagram of a top view of another display panel provided in an embodiment of the present application. As shown in FIG. 17, the display panel may further comprise touch electrodes 19 and touch parallel portions 23; the first signal lines 11 comprises touch signal lines 112 electrically connected with the touch electrodes 19 and the touch parallel portions 23, and the touch signal lines 112 and the touch parallel portions 23 are arranged in different layers.

As shown in FIG. 17, the display panel provided by the embodiment of the present application may further comprise a touch parallel portion 23, which may be understood as a structure arranged in parallel with the touch signal line 112. The touch signal line 112 is electrically connected with the touch electrode 19 and the touch parallel portion 23, respectively, so that the resistance of the touch signal line 19 can be reduced, the loss of the touch signal during the transmission process can be reduced, the transmission accuracy of the touch signal can be improved, and the touch sensitivity can be further improved.

Furthermore, the touch parallel portions 23 and the touch signal lines 112 are arranged in different layers. For example, the touch parallel portions 23 can be arranged on the side of the touch signal lines 112 close to the pixel electrode, or on the side of the touch signal lines 112 away from the pixel electrode. The embodiment of the present application does not limit the film layer for providing the touch parallel portion 23, but only needs to ensure that it will not be short-circuited with other signal lines and will not affect the normal transmission of other signals.

On the basis of the above embodiments, referring to FIG. 14, the first signal line 11 comprises a touch signal line 112 and a dummy touch signal line 113 arranged along the second direction Y; the display panel further comprises a touch chip (not shown in the figure), which comprises a touch signal terminal and a dummy control signal terminal, the touch signal line 112 is electrically connected with the touch signal terminal, and the dummy touch signal line 113 is electrically connected with the dummy touch signal terminal; the display panel further comprises a touch electrode 19, and along the thickness direction of the display panel, the touch electrode 19 overlaps with the touch signal line 112 and the dummy touch signal line 113, and the touch electrode 19 is electrically connected with the touch signal line 112, and is insulated from the dummy touch signal line 113.

As shown in FIG. 14, the first signal lines 11 may further include dummy touch signal lines 113. Compared with the touch signal line 112, the dummy touch signal line 113 does not transmit a touch signal, and the dummy touch signal line 113 is not electrically connected with the touch electrode 19, that is, the touch electrode 19 is insulated from the dummy touch signal line 113. The dummy touch signal line 113 is provided and electrically connected with the dummy touch signal terminal, so as to use the dummy touch signal line 113 to electrically connect the idle signal terminal in the touch chip to avoid the problem of poor touch caused by the signal terminal being idle and not connected with the signal line. Furthermore, the dummy touch signal line 113 is provided, so that the touch signal lines 112 at different positions have the same routing mode on both sides, which can avoid the damage to the touch signal accuracy caused by the different routing settings on both sides of the touch signal line 112, and avoid affecting the touch sensitivity. Taking the display panel shown in FIG. 14 as an example, among the nine touch signal lines corresponding to the same pixel electrode 19, the first to the sixth touch signal lines are touch signal lines electrically connected with the touch electrode 10, and the seventh to the ninth touch signal lines are dummy touch signal lines. Taking the fourth to the sixth touch signal lines as an example, when the dummy touch signal lines are not provided, there are touch signal lines on the left side of the fourth to the sixth touch signal lines, but no touch signal lines on the right side, resulting in different settings of the touch signal lines on the left and right sides, affecting the accuracy of the touch signals transmitted thereon, and further affecting the touch sensitivity; when the dummy touch signal lines are provided on the right side, there are touch signal lines both on the left side and the right side of the fourth to the sixth touch signal lines, so that the touch signal lines are set in the same way on the left and right sides, reducing the impact on the touch signals transmitted thereon and ensuring the touch sensitivity. Furthermore, the dummy touch signal line 113 is provided to ensure that touch signal lines are correspondingly provided at different positions of the touch electrode 19. Taking FIG. 14 as an example, the dummy touch signal line 113 is provided to ensure that the left part of the touch electrode 19 is correspondingly provided with a touch signal line electrically connected with the touch electrode 19, and the right part is correspondingly provided with a dummy touch signal line 113 insulated from the touch electrode 19, so as to ensure that the touch signal lines corresponding to the touch electrodes 19 at different positions are provided with good uniformity, for different positions of the touch electrode 19, having the same or similar influences on the optical performance and electrical performance, thereby ensuring the stability of the touch electrode performance.

On the basis of the above embodiment, the dummy touch signal line 113 is electrically connected with the common voltage signal terminal.

Specifically, since the dummy touch signal line 113 does not transmit a touch signal, in order to prevent the dummy touch signal line 113 from coupling with other potentials due to the potential being suspended and causing interference to the display and touch, the dummy touch signal line 113 can be electrically connected with a fixed potential terminal. By providing the dummy touch signal line 113 electrically connected with the fixed potential terminal, it can be ensured that the potential in the dummy touch signal line 113 is stable, and other signals will not be coupled, and the display and touch will not be interfered with.

Furthermore, the dummy touch signal line 113 can be electrically connected with the common voltage signal terminal to transmit a common voltage signal in the dummy touch signal line 113. This can ensure the stability of the potential in the dummy touch signal line 113, and reduce the loss of the power supply voltage signal during the transmission process, thereby improving the transmission accuracy of the common voltage signal. As the common voltage signal terminal already exists as a fixed potential signal terminal in the display panel, providing the dummy touch signal line 113 electrically connected with the common voltage signal terminal will not increase the process of the display panel, thereby ensuring that the solution of the dummy touch signal line 113 electrically connecting with the fixed potential signal terminal is simple and feasible.

Furthermore, the dummy touch signal line 113 is electrically connected with the common voltage signal terminal. This can be done by the dummy touch signal line 113 electrically connecting with the common voltage signal line in the display panel, or by providing the above-mentioned dummy touch signal terminal to provide the common voltage signal. The embodiment of the present application does not limit how to achieve the electrical connection between the dummy touch signal line and the common voltage signal terminal, and it is only necessary to ensure that the common voltage signal is transmitted in the dummy touch signal line.

Figure 18:
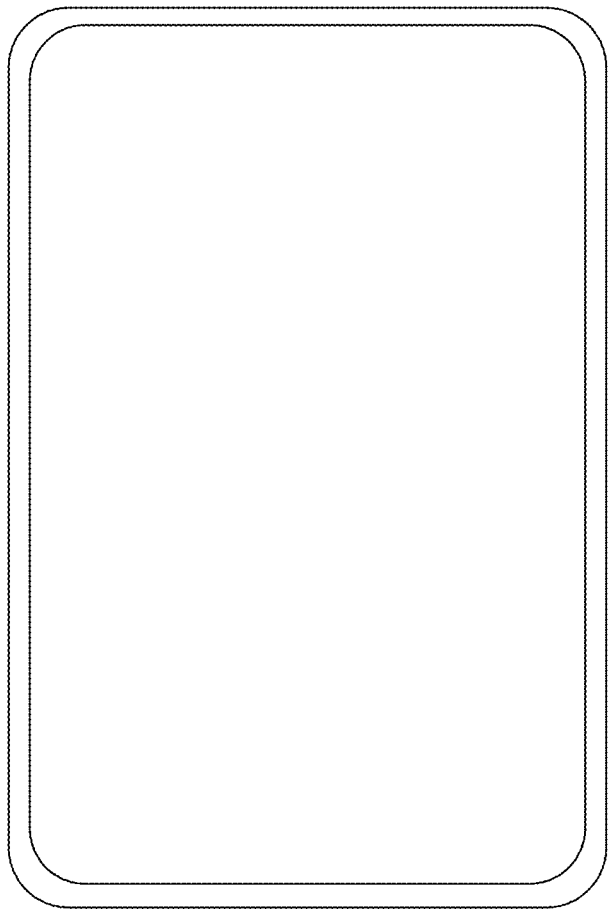
FIG. 18 is a schematic structural diagram of a display apparatus provided by an embodiment of the present application.

Based on the same inventive concept, an embodiment of the present application further provides a display apparatus. FIG. 18 is a schematic structural diagram of a display apparatus provided by an embodiment of the present application. As shown in FIG. 18, the display apparatus comprises the display panel in the above embodiment. Therefore, the display apparatus provided by the embodiment of the present application also has the beneficial effects described in the above embodiment, which will not be described in detail here. Exemplarily, the display apparatus can be an electronic devices such as a mobile phone, a computer, a smart wearable apparatus (for example, a smart watch), and a vehicle-mounted display apparatus, which is not limited by the embodiment of the present application.

It should be noted that the above are only preferred embodiments of the present application and the technical principles used. Those skilled in the art will understand that the present application is not limited to the specific embodiments herein, and that various obvious changes, readjustments, combinations and substitutions can be made by those skilled in the art without departing from the scope of protection of the present application. Therefore, although the present application has been described in more detail via the above embodiments, the present application is not limited to the above embodiments, and may comprise more other equivalent embodiments without departing from the concept of the present application, and the scope of the present application is determined by the scope of the appended claims.

What is claimed is:

1. A display panel, comprising:
   a plurality of first signal lines extending along a first direction and arranged along a second direction; and
   a plurality of second signal lines being arranged along the first direction and extending along the second direction, the first direction intersecting with the second direction,
   wherein the second signal lines and part of the first signal lines are insulated and crossed to define a plurality of pixel opening areas, and part of the first signal lines overlap with the pixel opening areas along a thickness direction of the display panel; and
   the display panel further comprises pixel electrodes located in the pixel opening areas and including a first pixel electrode overlapping with the first signal line in the thickness direction of the display panel, a width D1 of the first pixel electrode in the second direction and a width D2 of any of the other pixel electrodes in the second direction satisfying $|D1-D2|/D1 \leq 20\%$.

2. The display panel of claim 1, wherein at least one of the pixel electrodes comprises a plurality of interconnected branch electrodes extending along the first direction and arranged along the second direction; and
   along the second direction, a sum D1 of widths of the plurality of branch electrodes in the first pixel electrode and a sum D2 of widths of the plurality of branch electrodes in any of the other pixel electrodes satisfy $|D1-D2|/D1 \leq 20\%$.

3. The display panel of claim 1, wherein the display panel further comprises a light shielding structure covering the second signal lines and part of the first signal lines along the thickness direction of the display panel.

4. The display panel of claim 1, wherein the first signal lines include touch signal lines, at least part of the touch signal lines overlapping with the pixel opening areas along the thickness direction of the display panel.

5. The display panel of claim 4, wherein the display panel further comprises a common electrode, in which slits overlapping with the touch signal lines along the thickness direction of the display panel are provided; and
   every one of the pixel electrodes overlaps with the touch signal line along the thickness direction of the display panel.

6. The display panel of claim 5, wherein the display panel further comprises a plurality of pixel units comprising a first color sub-pixel, a second color sub-pixel and a third color sub-pixel arranged along the second direction,
   the pixel electrode in the first color sub-pixel, the pixel electrode in the second color sub-pixel, and the pixel electrode in the third color sub-pixel all overlapping with one of the touch signal lines along the thickness direction of the display panel.

7. The display panel of claim 4, wherein the first signal lines further comprise data signal lines;
   along the second direction, the data signal lines and the touch signal lines are arranged alternately;
   along the second direction, distances between any one of the touch signal lines and two data signal lines adjacent thereto are L1 and L2, respectively, where $|L1-L2|/L1 \leq 20\%$; and
   along the second direction, distances between any one of the data signal lines and two touch signal lines adjacent thereto are L3 and L4, respectively, where $|L3-L4|/L3 \leq 20\%$.

8. The display panel of claim 4, wherein the first pixel electrode comprises at least two branch electrodes connected with each other, and at least one hollow portion located between two adjacent ones of the branch electrodes; and
   along the thickness direction of the display panel, the hollow portion overlaps with the touch signal line.

9. The display panel of claim 1, wherein the first signal lines include data signal lines; and
   along the thickness direction of the display panel, at least part of the data signal lines overlap with the pixel opening areas.

10. The display panel of claim 9, wherein at least part of the pixel electrodes overlap with the data signal lines along the thickness direction of the display panel.

11. The display panel of claim 10, wherein the first signal lines further include touch signal lines each located between two adjacent columns of the pixel electrodes; and
    the display panel further comprises a common electrode, in which gaps overlapping with the touch signal lines along the thickness direction of the display panel are provided.

12. The display panel of claim 1, wherein the display panel further comprises touch electrodes, and the first signal lines include touch signal lines,
    the touch electrodes each being electrically connected with at least two of the touch signal lines.

13. The display panel of claim 12, wherein the display panel further comprises a touch connection portion, which electrically connects the at least two of the touch signal lines electrically connected with one of the touch electrodes,
    the touch connection portion extending along the second direction and being arranged in the same layer as the second signal lines; and
    the display panel further comprises a dummy touch connection portion, wherein
    the touch electrodes include a first touch electrode and a second touch electrode arranged along the first direction, at least two of the touch signal lines electrically connected with the first touch electrode being electrically connected via the touch connection portion and the dummy touch connection portion; along the thickness direction of the display panel, the first touch electrodes covering the touch connection portion, and the second touch electrode covering the dummy touch connection portion.

14. The display panel of claim 13, wherein the touch electrodes each are electrically connected with at least three of the touch signal lines comprising a first touch signal line, a second touch signal line and a third touch signal line arranged along the second direction; and
    the touch connection portion comprises at least a first connection portion and a second connection portion which are located between different rows of the pixel electrodes,
    the first connection portion electrically connecting the first touch signal line and the second touch signal line, and the second connection portion electrically connecting the second touch signal line and the third touch signal line.

15. The display panel of claim 1, wherein the display panel further comprises a touch electrode and a touch parallel portion;
the first signal lines comprise a touch signal line;
the touch signal line is electrically connected with the touch electrode and the touch parallel portion respectively, and the touch signal line and the touch parallel portion being arranged in different layers.

16. The display panel of claim 1, wherein the first signal lines comprise a touch signal line and a dummy touch signal line arranged along the second direction;
the display panel further comprises a touch chip comprising a touch signal terminal and a dummy control signal terminal, the touch signal line is electrically connected with the touch signal terminal, and the dummy touch signal line is electrically connected with the dummy touch signal terminal;
the display panel further comprises a touch electrode overlapping with both the touch signal line and the dummy touch signal line along the thickness direction of the display panel, being electrically connected with the touch signal line and insulated from the dummy touch signal line; and
the dummy touch signal line is electrically connected with a common voltage signal terminal.

17. The display panel of claim 1, wherein the first signal lines comprise a data signal line and a touch signal line arranged in the same layer.

18. The display panel of claim 1, wherein the display panel further comprises a common electrode,
along the thickness direction of the display panel, the common electrode being located on a side of the pixel electrode away from the first signal line; or, the common electrode being located on a side of the pixel electrode close to the first signal line; and
the display panel further comprises a touch electrode reusing the common electrode.

19. The display panel of claim 3, wherein the display panel further comprises an array substrate, an opposite substrate, and a liquid crystal layer arranged between the array substrate and the opposite substrate,
the array substrate comprising the first signal lines, the second signal lines and the pixel electrodes, and the opposite substrate comprising the light shielding structure.

20. A display apparatus, comprising a display panel comprising
a plurality of first signal lines extending along a first direction and arranged along a second direction; and
a plurality of second signal lines being arranged along the first direction and extending along the second direction, the first direction intersecting with the second direction,
wherein the second signal lines and part of the first signal lines are insulated and crossed to define a plurality of pixel opening areas, and part of the first signal lines overlap with the pixel opening areas along a thickness direction of the display panel; and
the display panel further comprises pixel electrodes located in the pixel opening areas and including a first pixel electrode overlapping with the first signal line in the thickness direction of the display panel, a width D1 of the first pixel electrode in the second direction and a width D2 of any of the other pixel electrodes in the second direction satisfying $|D1-D2|/D1 \leq 20\%$.

* * * * *